United States Patent [19]
Hoshino et al.

[11] Patent Number: 6,073,062
[45] Date of Patent: Jun. 6, 2000

[54] MOBILE TERMINAL AND MOVING BODY OPERATION MANAGEMENT SYSTEM

[75] Inventors: Masao Hoshino, Chigasaki; Miyuki Sato, Kawasaki, both of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,750

[22] Filed: May 23, 1996

[30] Foreign Application Priority Data

May 31, 1995 [JP] Japan .................................. 7-134087

[51] Int. Cl.$^7$ .............................. B64C 17/00; G05D 1/00; G05D 3/00
[52] U.S. Cl. ................................ 701/3; 701/32; 340/426; 340/438; 340/825.34
[58] Field of Search ................................. 701/3, 32, 33, 701/24; 342/357, 46; 340/426, 430, 438, 528, 825.34, 825.44, 870.16

[56] References Cited

U.S. PATENT DOCUMENTS

| | | | |
|---|---|---|---|
| 4,757,454 | 7/1988 | Hisatake et al. . | |
| 4,975,846 | 12/1990 | Abe et al. | 701/32 |
| 4,996,643 | 2/1991 | Sakamoto et al. | 701/32 |
| 5,157,610 | 10/1992 | Asano et al. | 701/32 |
| 5,249,127 | 9/1993 | Komatsu . | |
| 5,307,277 | 4/1994 | Hirano . | |
| 5,371,497 | 12/1994 | Nimura et al. | 701/209 |
| 5,557,268 | 9/1996 | Hughes et al. | 701/32 |
| 5,565,857 | 10/1996 | Lee | 340/825.34 |
| 5,602,739 | 2/1997 | Haagenstad et al. . | |
| 5,649,300 | 7/1997 | Snyder et al. | 455/517 |
| 5,686,765 | 11/1997 | Washington | 180/287 |
| 5,721,678 | 2/1998 | Widl . | |

FOREIGN PATENT DOCUMENTS

| | | |
|---|---|---|
| 2 386 084 | 10/1978 | France . |
| 2386084A | 10/1978 | France . |
| 92 14 123 | 1/1993 | Germany . |
| 9214123 U | 2/1993 | Germany . |
| 43 10 099 | 9/1994 | Germany . |
| 41 08 124 | 9/1997 | Germany . |
| 2261977A | 6/1993 | United Kingdom . |
| 2271180A | 4/1994 | United Kingdom . |

*Primary Examiner*—William A. Cuchlinski, Jr.
*Assistant Examiner*—Gertrude Arthur
*Attorney, Agent, or Firm*—Staas & Halsey LLP

[57] ABSTRACT

The present invention relates to an operation management system for a moving body such as a vehicle using a mobile terminal. The present invention reliably and accurately records the operating conditions of vehicles, which enables management to gather accurate information regarding the work performed by a driver or crew in the moving vehicle. Moreover, the present invention realizes safe operation of a moving vehicle by detecting, during operation of a moving body, whether the moving body is exceeding the speed limit and informing the crew of this condition so that the driver will reduce speed to obey the speed limit. The present invention also deters theft of vehicles.

36 Claims, 31 Drawing Sheets

FIG.7

70 (DRIVER DB)

| DRIVER ID | DRIVER INFORMATION | | | WORK INFORMATION | | |
|---|---|---|---|---|---|---|
| | NAME | CLASS OF LICENSE | ... | DATE, TIME OF WORK | VEHICLE ID | ... |
| 000001 | HOSHINO | LARGE SIZE FOR SPECIAL USE | ... | 10.31 9:00~15:00 | 1010 | ... |
| 000002 | SATO | SMALL SIZE FOR SPECIAL USE | ... | 10.31 8:40~18:00 | 0101 | ... |
| ... | 711 | 712 | | 721 | 722 | |

| CONDITION | REMARKS | START OF WORK | DEPARTURE | STOP OF VEHICLE | ARRIVAL | REST, CHECK FUELING ETC. | LOADING/UNLOADING | END OF WORK |
|---|---|---|---|---|---|---|---|---|
| SEAT BELT | | — | — | — | × | × | — | — |
| GOODS CHAMBER DOOR | | — | — | — | — | — | × | — |
| DRIVER'S DOOR | | — | — | — | × | × | — | — |
| VEHICLE SPEED, DISTANCE | | — | ○ | — | — | — | — | — |
| ENGINE | | — | ○ | × | × | × | × | × |
| KEY ON / OFF | | ○ | — | — | — | — | — | × |
| KIND OF SENSOR | | ON / OFF CONDITION | | | | | | |

Remarks:
- DEPARTURE: WHEN HAVING MOVED FOR PREDETERMINED DISTANCE
- REST, CHECK FUELING ETC.: INPUT OF WORK CONTENTS
- END OF WORK: WHEN HAVING REACHED THE OFFICE

○ : ON   × : OFF   — : NOT USED FOR JUDGEMENT

FIG. 32A

EXAMPLE OF DAILY REPORT

PERSONAL
DAILY REPORT, HOSHINO (CLASS OF VEHICLE) (ID)
LARGE SIZE 1010
SMALL SIZE 0101

EXAMPLE OF DAILY REPORT

VEHICLE
DAILY REPORT, LARGE SIZE (NAME)    (ID)
HOSHINO   000001
SATO      000002
YOSHINAGA 000003

9:00  10:00  11:00  12:00  13:00  14:00  15:00  16:00  17:00

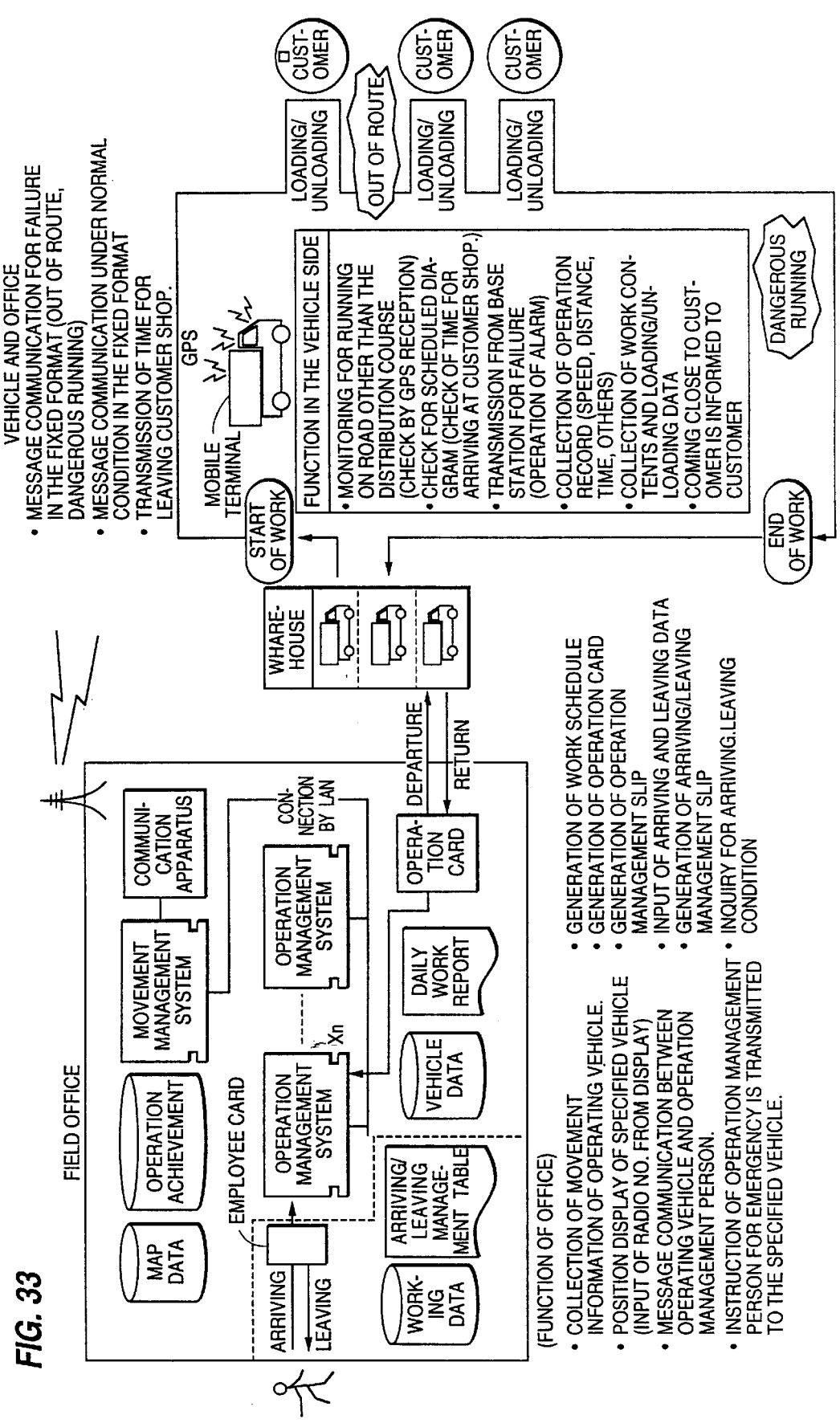

MOBILE TERMINAL AND MOVING BODY OPERATION MANAGEMENT SYSTEM

BACKGROUND OF THE INVENTION

1. Field of the Invention

The present invention relates to an operation management system for a moving body such as a vehicle and an operation management terminal or a mobile terminal used in a moving body.

Although the present invention is directed toward moving vehicles on a highway, the present invention can easily be applied to ships and aircrafts, or to terminals which may be carried by a person.

2. Description of the Related Arts

There is a demand for highly efficient management operation of moving vehicles, and for avoidance of any labor/management problems. For the existing operation management of moving vehicles, daily reports of operation, for example, have been presented. For example, in an existing method, when a vehicle, such as a taxi cab, picks up a passenger, a driver of the vehicle enters the pickup section into a daily report with its charge. After the driver returns to the office, the driver presents the daily report. Alternatively, in the case of picking up or delivering goods, a driver (or a crew) enters the delivery point and arriving time into the daily report each time the driver reaches the delivery point.

Moreover, in order to check the distance the vehicle has traveled, a tachometer is generally installed into a vehicle. After the vehicle has returned to the office, the contents of the daily report are collated with the record of the tachometer to verify whether the contents of the daily report are correct.

In another method, a mobile terminal is installed in every vehicle and the operating conditions of each vehicle is input into its corresponding terminal. FIGS. 34A and 34B are diagrams illustrating a mobile terminal for realizing existing vehicle operation management. As shown in FIG. 34A, an existing mobile terminal 1000 is provided with various kinds of work keys in a keyboard 1010 for information input. Each key is given a function relating to the type of work being performed by the employee. The types of the work can be input by depressing keys. The types of work include beginning work, ending work, departure from office, loading or unloading goods, waiting, traveling an ordinary road, traveling through an expressway (toll road), checking vehicle, washing vehicle, etc. Moreover, the mobile terminal is also provided with a key to input a toll for traveling, for example, on a toll road.

As shown in FIG. 34B, a driver inserts a card 1030 into a card reader/writer 1040. When the driver places the key in the ignition and/or the engine is rotated, a sensor input unit 1050 receives a signal indicating that the driver has started the vehicle. The main controller 1060 controls the card reader and sensor input unit. The main controller has access to RAM 1070 and ROM 1080. The main controller 1060 receives input from the driver by way of the keyboard 1010, which is controlled by the keyboard controller 1015. The main controller displays information to the driver by way of the display controller 1090 and display 1020. The main controller 1060 also has access to a bar code reader controller 1100 and a bar code reader 1110.

In the case of inputting information into a mobile terminal, a driver inputs a type of work, by operating the appropriate key of the mobile terminal corresponding to the work. For example, when a driver leaves the office to work, the driver depresses the "Departure" key. When a driver starts loading or unloading goods at the loading or unloading point, the driver depresses the "Loading/Unloading" key. As explained above, each time when an employee performs work, a driver operates the mobile terminal to input the information indicating the type of work performed.

However, since the procedures are very complicated even in the method in which types of work and time are entered into the daily report or in the method in which the types of work are input using keys provided on the mobile terminal 1000, the driver often forgets to input data to the daily report or to the mobile terminal 1000 and it is very difficult to eliminate this problem.

Moreover, since each type of work performed requires entry of data to the daily report or key operation of the mobile terminal 1000, when a person who is required to enter data is a driver, the driver must do other work in addition to the driving. As a result, the driver has an additional and complicated burden.

Furthermore, it is also probable that a worker makes false entry or key-operation at the time of inputting the type of work performed and it will result in a problem for labor management. In an example of entering the types of work performed into the daily report, basically, there is no way of verifying whether the information entered into a daily report is correct. It is possible, to a certain extent, to check the correspondence between the distance traveled by the vehicle and the daily report by referencing both the tachometer and written contents of the daily report. However, this is not a perfect method. The direction, in which a vehicle travels, cannot be read from the tachometer, and it is impossible to check the actual route taken by the driver of the vehicle.

In addition, even if the types of work performed by the driver are input by the key operations from a mobile terminal, it is probable that a worker will not input the data when the driver must execute the input operation or a worker will input false data by the key operations when the driver should not execute the key operations. Therefore, the accurate collection of work information based on the information input from the mobile terminal 1000 is disabled.

Further, since the routes of the vehicles are not recorded in the methods of the related art, it is very difficult to generate an effective and economical operation plan, including determination of future routes and sequence from the operating conditions in the past.

SUMMARY OF THE INVENTION

An object of this invention is to provide a moving body operation management system for more reliably and accurately recording the operating conditions of moving bodies with a more simplified method by reducing the burden on a driver or other member of a crew wherein the moving body may be a vehicle or other transportable equipment used by such a driver or crew member in performing work pursuant to work instructing information, at a local or remote destination.

Another object of this invention is to collect information, such as operating conditions in the optimum interval depending on the kinds of roads and traffic conditions thereof, and moreover to prevent mistakes in collecting information by automatic selection of an information collecting interval without any manual operations.

A further object of this invention is to realize a mobile terminal, which can prevent theft and/or wrong use of a vehicle.

Another object of this invention is to save manual information input operation to prevent not only forgetting of input or input mistake but also dishonest input of work information.

Another object of this invention is to prevent input error and/or wrong demand of a toll, while traveling on a toll road, by saving the toll input in memory by a crew to the mobile terminal.

A further object of this invention is to realize safe operation of the moving body by detecting, during operation of the moving body, whether the moving body is exceeding the speed limit and informing the crew of this condition, causing the driver to obey the speed limit of each road.

According to the first aspect of this invention, there is provided a mobile terminal to be installed in a moving body, comprising a memory for storing an identification code which is individually assigned to each terminal, a collator for collating an identification code inputted from an external unit with the identification code stored in the memory, and a controller for at least activating or deactivating the moving body when the identification codes are judged to match as a result of collation of codes by the collator.

According to another aspect of this invention, there is provided a mobile terminal wherein a second memory, such as RAM, is provided to store a terminal identification code, which is inputted when the moving body is activated, and to store a crew identification code for identifying a crew of the moving body. The collator further collates the crew identification code, which is inputted when the moving body is deactivated, with the crew identification code stored in the second memory. The controller deactivates the moving body on the basis of the collation result of the crew identification code by the collator. The first memory and the second memory may be memories which are physically different or may also be memories assigned to a plurality of regions obtained by theoretically dividing the inside of one memory area.

According to another aspect of this invention, there is provided a mobile terminal comprising a transfer unit for receiving information including work instruction data which is externally transferred to instruct the driver utilizing a moving body, a controller for extracting the work instruction data for the moving body and loading the mobile terminal with the information received from the transfer unit, and a memory for storing the work instruction data extracted from the transfer unit by the controller.

According to another aspect of this invention, there is provided a mobile terminal comprising an input unit connecting one or a plurality of sensors, which are mounted on a moving body to output signals depending on the condition of the mounting areas, a memory for storing conditions of the output signals of the sensors and corresponding condition of the moving body and/or work content utilizing the moving body and a discriminating unit for referencing the memory based on the output signals of sensors input from the input unit to discriminate or ascertain conditions of the moving body based on the contents stored in the memory.

In this aspect of this invention, the invention may also comprise a second memory for storing information concerning the condition of the moving body discriminated by the discriminating unit. This second memory may be physically separated or different from the first memory or first and second memories may also be assigned to different regions reserved by dividing one memory into a plurality of regions.

Moreover, in this aspect, the invention may also comprise a transfer unit for transferring, to the external side, the information concerning the condition of the moving body discriminated by the discriminating unit; and a position detecting unit for determining the current position of the moving body to store the information concerning the condition of the moving body determined by the discriminating unit into the second memory together with the information concerning the current position of the moving body determined by the position detecting unit. Moreover, the present invention may further comprise an output unit for outputting a message urging a crew of the moving body to input the condition of the moving body and the type of work being performed utilizing the moving body at the time when the discriminating unit judges that the condition of the moving body cannot uniquely be discriminated based on the output signals of the sensors.

According to another aspect of this invention, there is provided a mobile terminal comprising a collector for collecting the moving body operation information such as the moving speed and moving distance of the moving body, and a memory for storing an interval for collecting the moving body operation information accessed by the collector.

In this aspect, a discriminating unit determines the current position of the moving body, the memory stores as a pair the information concerning interval for collecting information and the position information, and the collector collects, when the discriminating unit determines that the moving body has reached the position corresponding to the position information stored in the memory. The operation information based on the collecting interval of the collected information stored with the position information as a pair.

According to another aspect of this invention, there is provided a mobile terminal comprising a first memory for storing the toll road entrance and exit information and toll of the toll road, a discriminating unit for determining the current position of the moving body, also discriminating whether the moving body is traveling on the expressway or not by collating the current position of the moving body and the toll road entrance and exit information stored in the first memory with the toll of the section of the toll road traveled by the moving body by referencing the first memory; and a second memory for storing the actual entrance, exit and toll of the toll road discriminated by the discriminating unit.

According to another aspect of this invention, there is provided a mobile terminal comprising a discriminating unit for determining the current position of the moving body, memory for storing moving conditions such as a speed limit of a road together with the position information presetting the moving conditions, sensors for detecting the moving conditions of the moving body such as the speed of the moving body, a collator for reading, from the memory, the moving conditions corresponding to the current position of the moving body determined by the discriminating unit to collate such conditions with the moving condition of the moving body detected by the sensors and a controller for outputting a message to a crew of the moving body when the collation of the collator proves that the current moving conditions of the moving body do not correspond to the moving conditions of the relevant position.

According to another aspect of this invention, there is provided a moving body operation management system comprising a moving body information database for storing at least operation information of each moving body and a crew information database for storing at least operation management information of each crew member of the moving body.

In this aspect, the crew information database may also store the qualification information for the moving body of each crew member and particularly the qualification information for the moving body including driving license of each crew member.

According to another aspect of this invention, there is provided a moving body operation management system comprising work instruction information generating unit for generating work instruction information to provide instructions regarding work to be performed to a mobile terminal unit, a host unit comprising first transfer unit for transferring the information including the work instruction information to the mobile terminal unit, second transfer unit for receiving the information including the work instruction information transferred from the first transfer unit and a memory for storing the work instruction information. In this aspect, the second transfer unit transfers information to the host unit from the mobile terminal unit, while the first transfer unit receives the information transferred from the second transfer unit.

The first and second transfer units may be used for transmitting and receiving, by radio, the necessary information to at least read or write the information to or from the portable type memory medium in order to transfer the information including the work instruction information via the portable type memory medium.

Moreover, in the moving body operation management system comprising a host unit and one or a plurality of mobile terminals mounted in one or more moving bodies for management of the information concerning the operation of moving body, the host unit comprises a moving body information database for storing, for each moving body, the information concerning the moving body itself and operation information concerning operation of the moving body; crew information database for storing, for each crew member, the information concerning at least the crew of the moving body; an input unit for inputting at least the identification code of the crew; and discriminating unit for collating, based on the identification code input from the input unit, the crew qualification information of the moving body read from the moving body information database with a class of the moving body which will be driven by the crew to discriminate, depending on the result of collation, whether the driver of the crew can drive the relevant moving body.

In this aspect, moreover, the host unit further comprises an output unit for outputting the work instruction information for instructing at least the work content of the crew utilizing the moving body, when the discriminating unit discriminates the relevant crew has the qualification to drive the relevant moving body.

According to another aspect of this invention, there is provided a terminal unit comprising one or a plurality of sensors, which are mounted at respective areas to output the signals in accordance with conditions of mounting areas and input unit for inputting sensor outputs. The terminal unit further comprises a first memory for storing information concerning condition of the moving body depending on sensor outputs and a discriminating unit for discriminating the current condition of the moving body by referencing the first memory depending on the sensor outputs.

According to another aspect of this invention, there is provided a moving body comprising engine, controller for controlling at least the engine to start or stop, a memory for storing the identification code assigned to the moving body and an input unit for accepting an input of the identification code when the engine starts or stop, whereby to control the engine to start or stop when the identification code stored in the memory and the identification code input from the input unit are matched as a result of collation by the controller.

In this aspect, the input unit accepts input of the identification code of the crew of the moving body when the engine starts or stops and the engine is controlled to stop only when the identification code of the crew inputted when the engine starts and the identification code of the crew inputted when the engine stops are matched as a result of collating by the controller.

BRIEF DESCRIPTION OF THE DRAWINGS

FIG. 7 is a diagram for explaining detailed information of a driver's database.

FIG. 28 is a diagram illustrating an example of criterion for determining the type of work to be performed in this invention.

FIG. 32A and FIG. 32B are diagrams illustrating an example of daily work reports generated for each driver and each vehicle.

FIG. 33 is a diagram illustrating an application example of the vehicle operation management system to be applied to distribution and pickup of goods.

DESCRIPTION OF THE PREFERRED EMBODIMENT

Figure 1:
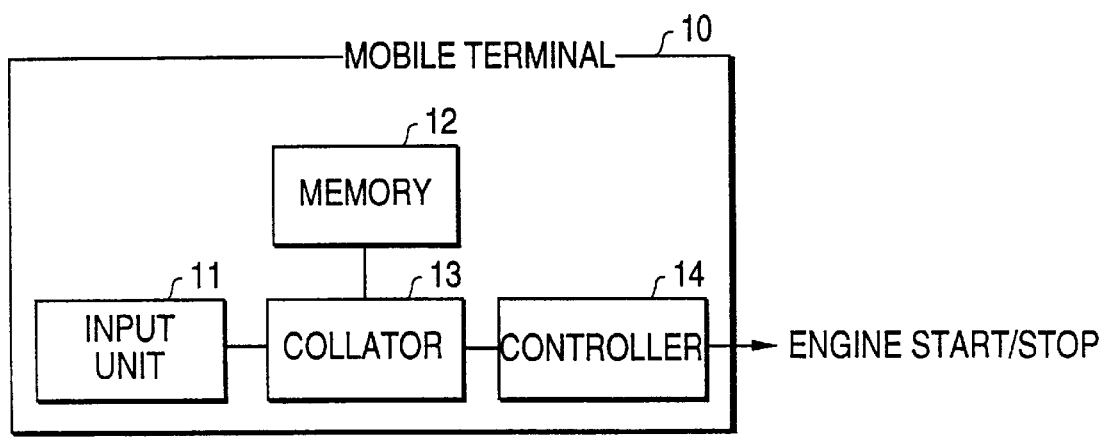
FIG. 1 is a block diagram illustrating a first embodiment of a mobile terminal.

FIG. 1 is a block diagram illustrating a first embodiment of a mobile terminal of the present invention. The mobile terminal may be mounted, for example, in each vehicle of a transportation company for the purpose of vehicle operation management.

FIG. 1 shows a mobile terminal 10 including an input unit 11 for inputting an identification code assigned to each driver, which is assigned to a vehicle; a memory 12 for storing the identification code intrinsically assigned to each vehicle (or mobile terminal); a collator 13 for collating the vehicle identification codes stored in the memory with the vehicle identification codes input from the input unit 11; and a controller 14 for controlling the vehicle to start or stop the engine depending on the result of collation in the collator 13. The details for controlling the starting or stopping of the engine will be explained later. Moreover, the controller 14 also controls operation of the mobile terminal 10.

Figure 2:
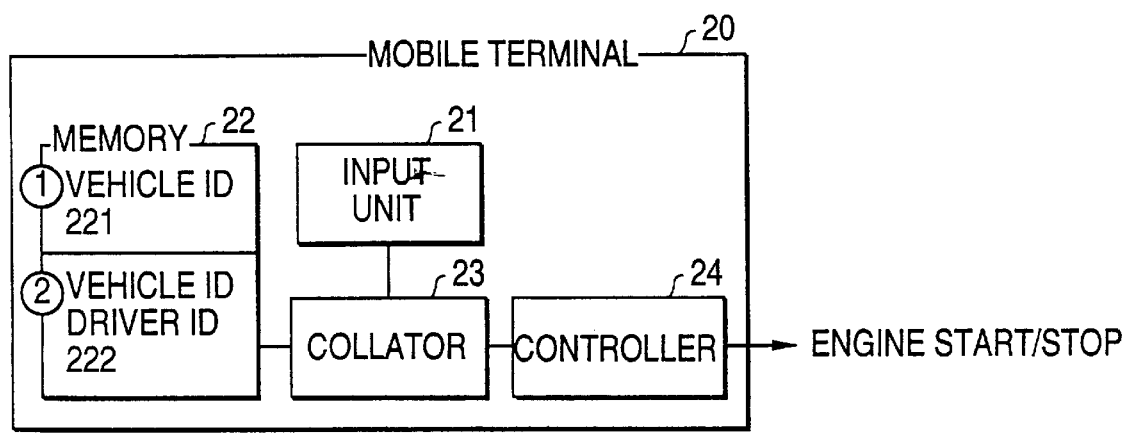
FIG. 2 shows another example of the mobile terminal.

FIG. 2 shows another example of a mobile terminal 20. The mobile terminal 20 identification cut unit 21 from which various identification codes are input as in FIG. 1 as well as other pieces of vehicle operation information. The input unit 21, for example, may be a keyboard, IC card reader or a radio communication controller.

A memory 22 in the mobile terminal 20 may be divided into a plurality of regions such as a first region 221 and a second region 222. In the first region 221, the intrinsic pieces of identification information (ID) of vehicles are stored. In the second region 222, the vehicle ID information inputted from the input unit 21 and the driver ID information are temporarily stored.

The collator 23 collates the vehicle ID information stored in the first region 221 of the memory 22 with the vehicle ID information stored in the second region 222 of the memory 22 and outputs the result of the collation.

The controller 24 controls the vehicle engine to start or stop, depending on the result of the collation of vehicle ID information by the collator 23. Moreover, the controller 24 also controls operation of the mobile terminal 10.

Figure 3:
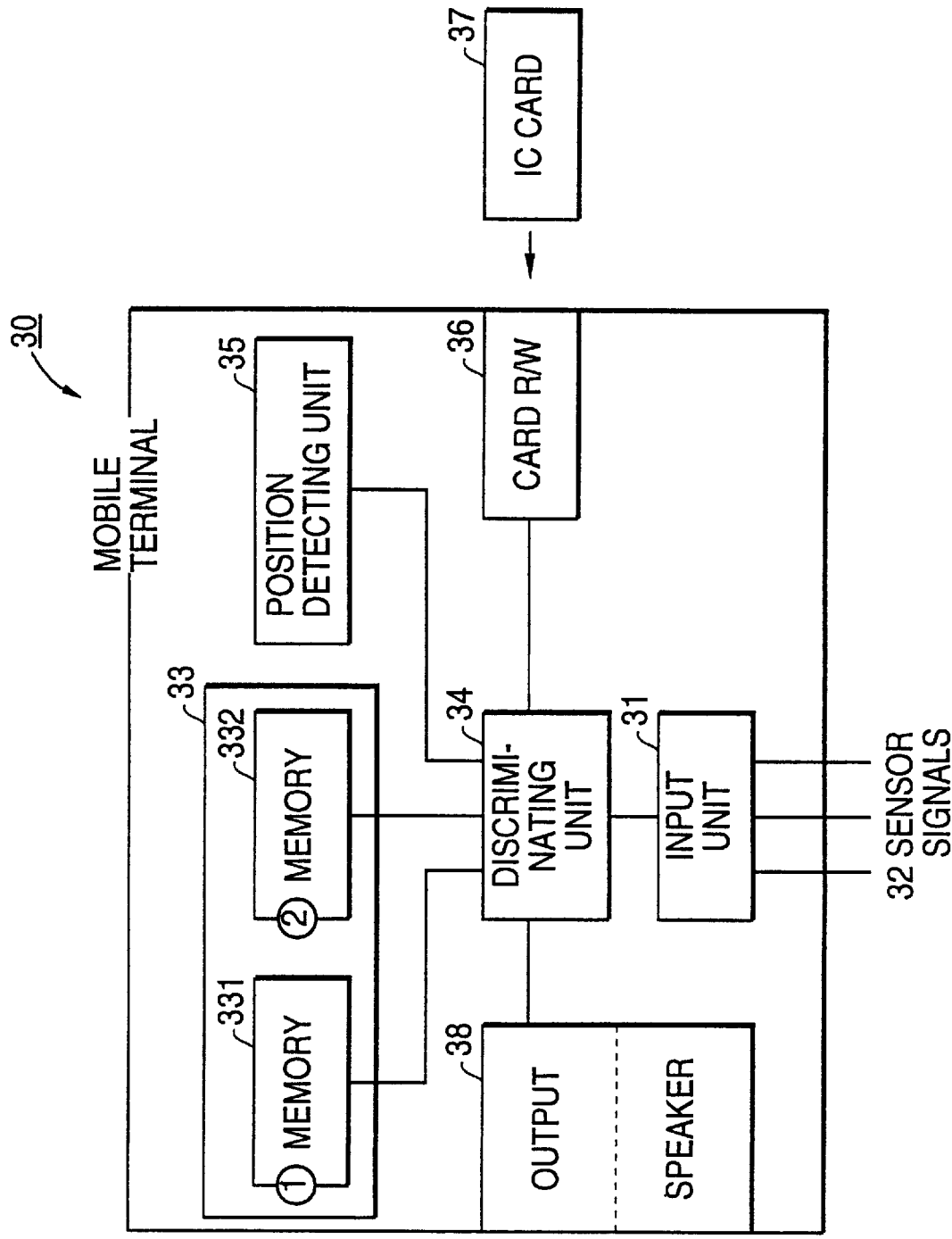
FIG. 3 is a diagram illustrating a second embodiment of a mobile terminal.

FIG. 3 is a diagram of a second embodiment of a mobile terminal 30. A mobile terminal 30 includes an input unit 31 to which output signals of the sensors (not shown) mounted at various locations in the vehicle are inputted. Each sensor judges the condition of each sensor mounting area and outputs an output signal depending on the judgment result. The mobile terminal 30 further includes a memory 33 including a first memory region 331 and a second memory region 332. The first memory region 331 stores a condition of the output signal of each sensor and the corresponding information indicating the conditions of the corresponding vehicle.

A discriminating unit 34 references the first memory region 331, depending on respective sensor output signals inputted to the input unit 31, to ascertain the current condition of the vehicle. The information indicating the vehicle conditions refers to, for example, the information indicating the operating condition of vehicle (start and stop of engine, unloading of goods, etc.).

The second memory region 332 stores information concerning the conditions of the vehicle discriminated or ascertained by the discriminating unit 34. This information is generated, for example, at predetermined time intervals or when generation thereof is instructed. The details of the discriminating unit 34 will be explained later.

The mobile terminal 30 further includes a position detecting unit 35 for detecting the current position of the vehicle. As a method of detecting the vehicle position, for example, there is a GPS (Global Positioning System). However, in this embodiment, the position detecting method is not limited to the GPS and other methods may be used. The information concerning the current position of the vehicle detected by the position discriminating unit 34 is stored, for example, in the second memory region 332 corresponding to the vehicle condition information at this time. Storing of such corresponding information enables a crew later, for example, after the vehicle has returned to the office, to check the type of work performed and where the work was performed.

The mobile terminal 30 further includes a card reader/writer 36 for writing information into a medium such as IC card 37 loaded from the external side of the mobile terminal 10 and for reading information from the medium. Since the IC card 37 has a comparatively large memory capacity, this IC card 37 may be used as the second memory region (instead of the second memory region 332) to store the information concerning the vehicle condition ascertained or discriminated by the discriminating unit 34. The second memory region 332 may be provided in the mobile terminal 30, but is not always required to be provided in the mobile terminal 30 as discussed above.

An output unit 38 outputs various pieces of information to a driver. The mobile terminal 30 can discriminate or ascertain vehicle conditions depending on outputs of the sensors mounted at respective areas of vehicle, but it is impossible in some cases to uniquely and accurately detect vehicle conditions only with sensor outputs. Under certain circumstances, a message is outputted to a driver urging to input the information indicating the work performed and the current vehicle condition. As the output unit 38, a loud speaker is used in FIG. 3 to output a voice message. However, a display, for example, may also be used to display various kinds of messages. Moreover, other devices, which can transfer a message to the driver, can also be used as the output unit 34.

Figure 4:
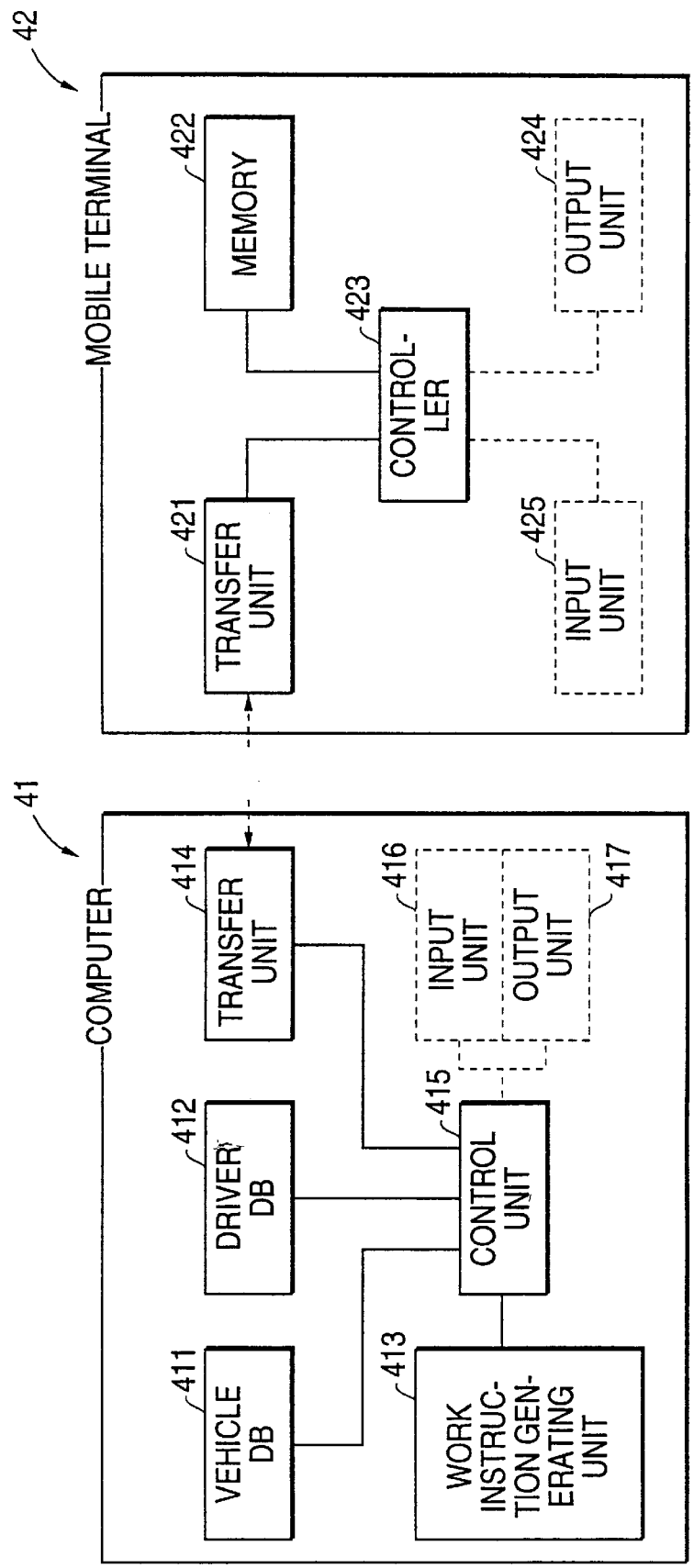
FIG. 4 is a diagram illustrating a first embodiment of a vehicle operation management system of this invention.

FIG. 4 is a diagram illustrating a first embodiment of the vehicle operation management system. This vehicle operation management system includes, for example, a computer 41 or other computing device installed as a host unit in the office and at least one mobile terminal 42. The computer 41 includes a vehicle database 411 for storing the intrinsic information (vehicle number, load, etc.) of each vehicle and the information concerning the operating condition of each vehicle and referred to hereinafter, from time to time, as "class of vehicle" or "vehicle classification information. The computer 41 also includes a driver database 412 for storing the pertinent information (name, kind of driving license, etc.) of each driver referred to hereinafter, from time to time, as "class of driving license" work information" working for the office and the pertinent information regarding work to be performed by each driver (date, work contents, etc.).

The computer 41 further includes a work instruction generating unit 413 for generating work instruction information for instructing the driver of the types of work to be performed referred to hereinafter, from time to time, as "work information"; and a transfer unit 414 for transferring the generated work instruction information to a mobile terminal 42. The transfer unit 414 may be a radio communication controller, so that the work instruction information is transferred, by radio, to the mobile terminal 42. The transfer unit 414 may also be an IC card reader/writer, so that the work instruction information is written into the IC card, which is then inputted to the mobile terminal 42. In addition, the computer 41 is also provided with a control unit 415 for controlling each apparatus. The computer 41 may also include an input unit 416 such as a keyboard and/or one or more output units 417 such as a display unit and/or a printer for outputting various pieces of information, and an input unit 416 for inputting various pieces of information.

The mobile terminal 42 includes a transfer unit 421 for receiving the work instruction information transferred from the computer 41. This transfer unit 421 may be a radio communication controller or an IC card reader/writer. For example, when an IC card reader/writer is provided in the computer 41, a corresponding IC card reader/writer is used in the mobile terminal 42. An IC card is loaded into the IC card reader/writer, provided in the mobile terminal 42, to read the work instructions written in the memory of the IC card. If the transfer unit 414 is a radio communication controller, then the transfer unit 421 of the mobile terminal 42 is a radio communication controller.

The mobile terminal 42 further includes a memory 422 for storing the work instruction information transferred from the computer 41 by the transfer units 414 and 421 of the computer 41 and mobile terminal 42. The mobile terminal 42 has a controller 423 for controlling the operation of the mobile terminal 42. Moreover, the mobile terminal 42 may be provided, as required, with an output unit 424 such as a display unit or a loud speaker for outputting various pieces of information such as work instruction information, and an input unit 425 such as a keyboard for inputting information.

The mobile terminal 42 as shown in FIG. 4 is provided with a part and/or the entire part of each item installed in the mobile terminals 10, 20 and 30 shown in FIGS. 1 to FIG. 3. Various functions may be given to a mobile terminal 42 by adequately combining the items of the mobile terminals 10, 20, 30 and 42 shown in FIG. 1 to FIG. 4.

Figure 5:
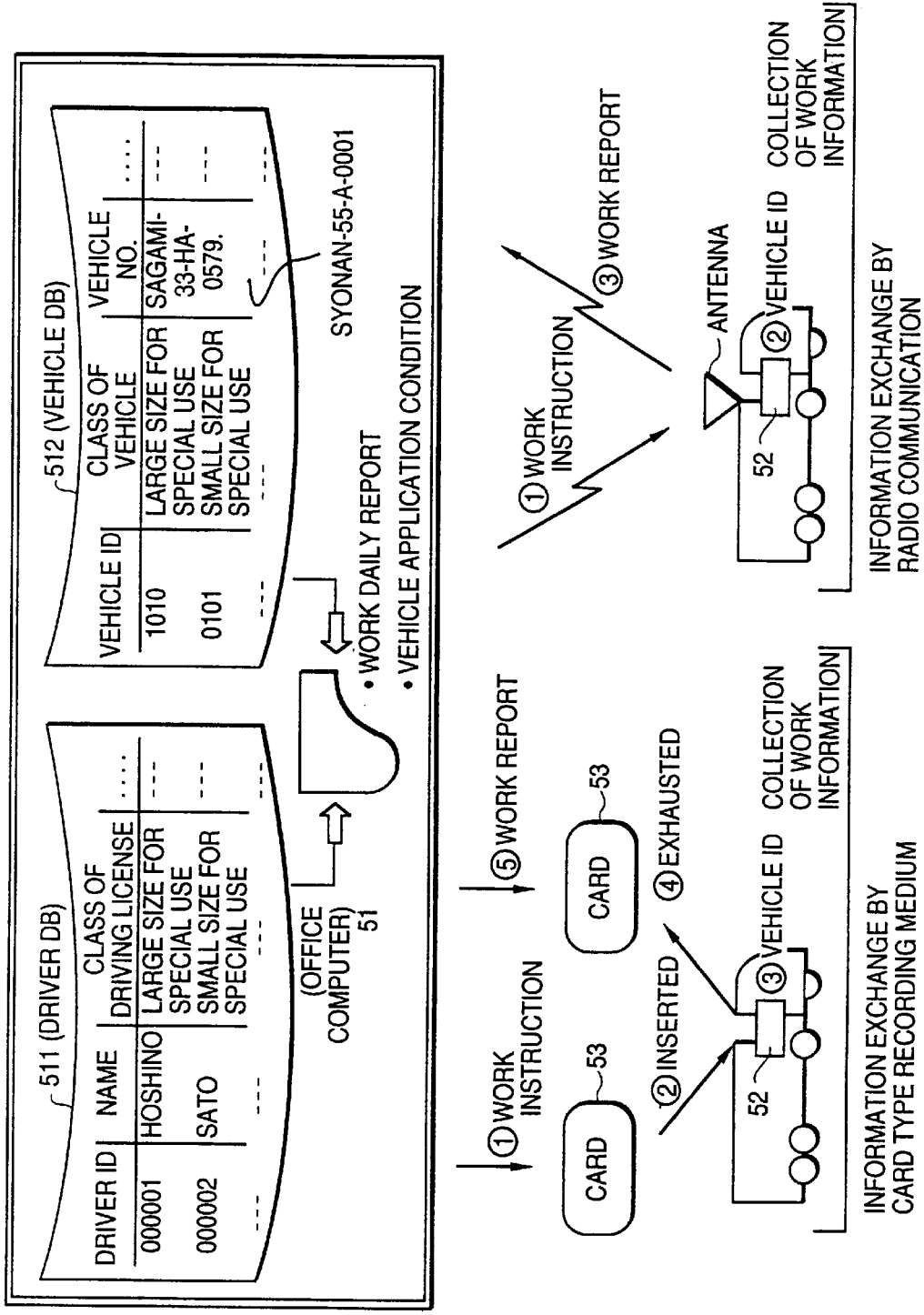
FIG. 5 is a diagram illustrating the first embodiment of the vehicle operation management system.

FIG. 5 is a diagram illustrating a vehicle operation management system (hereinafter referred to as a management system) to which this invention is applied. As shown in FIG. 5, the management system of the embodiment includes a host computer (hereinafter referred to as a computer or an office computer) 51 to be installed in the office, a terminal (hereinafter referred to as a mobile terminal) 52 to be installed in each respective vehicle and an IC card 53 carried by a driver of each vehicle.

The host computer 51 is provided with a driver database 511 for storing and administrating information including ID No., name, kind of driving license and working conditions of each driver working for the office. The host computer 51 is further provided with a vehicle database 512 for storing and administrating information including ID No., class of vehicle, vehicle No. and operating conditions of the vehicles assigned to the office. In the office, the operating conditions of vehicles can be detected by referencing the information stored in these databases 511 and 512. In addition, an operation schedule of vehicles can be planned as required and the period for vehicle maintenance can be checked. Moreover, since the work conditions of each driver can be checked, the labor management of drivers becomes easier.

The mobile terminal 52 receives a work instruction information for instructing work contents to be executed in a day given from the office (computer) 51 and sends the collected work report information by collecting various pieces of work report information generated during operation of the vehicle. The computer 51 classifies the various pieces of work report information collected from the mobile terminal 52 for each vehicle and driver and updates the vehicle database 512 and driver database 511 depending on the information classified to output a daily report of work as required.

In this embodiment, there are provided two kinds of methods, wherein the work instruction information is sent to the mobile terminal or vehicle computer 52 from the host computer 51 or the work report information is sent to the computer 51 from the mobile terminal 52. In one method, transfer of data is carried out via an IC card 53 assigned to each driver. In another method, radio communication is introduced between the computer 51 and mobile terminal 52.

In the case of transferring information using an IC card 53, the work instruction information is written on the IC card 53 with an IC card reader/writer (not shown) connected to the office computer or host computer 51 and the information written on the IC card 53 is then read with an IC card reader/writer (not shown) provided in the mobile terminal 52. Moreover, the work report information generated during operation of the vehicle is written on the IC card 53 with the IC card reader/writer of the mobile terminal 52. This IC card 53 is inserted into the IC card reader/writer provided in the office computer 51 to save the work report information written on the same IC card 53. The details of this operation will be explained later.

In this embodiment, an IC card 53 is used as an information transfer unit, but other memory medium can also be used so long as it is a portable type memory medium. For example, a magnetic disk or a magnetic card may be used without relation to a type of memory medium.

In the method of communicating between the computer 51 and mobile terminal 52 by radio, a hand-held telephone set or other type of radio communication unit may be used between the computer 51 and mobile terminal 53. An antenna must be installed on a vehicle. Using the radio communication unit, the work instruction information and work report information can be transmitted or received. If the work instruction contents are changed during the course of vehicle operation, the changed work instructions are transmitted or transferred to a vehicle computer 52 from the office computer 51 for flexible response to a change in work instructions. Moreover, the work report information generated in each vehicle can be transmitted to the office on a real time basis. Therefore, the office immediately detects the work being performed such as the current position of each vehicle. When traffic congestion occurs or a distribution sequence is required to be changed, various instructions for changing vehicle operation route and distribution sequence can be transmitted immediately to a driver of each vehicle. Traffic conditions of a road can be estimated by checking the operating condition transferred from each vehicle, particularly the positions of a vehicle with passage of time. With information transferred by radio between the computer 51 and mobile terminal 52, a driver can receive a change in work instructions without-returning to the office.

Figure 6:
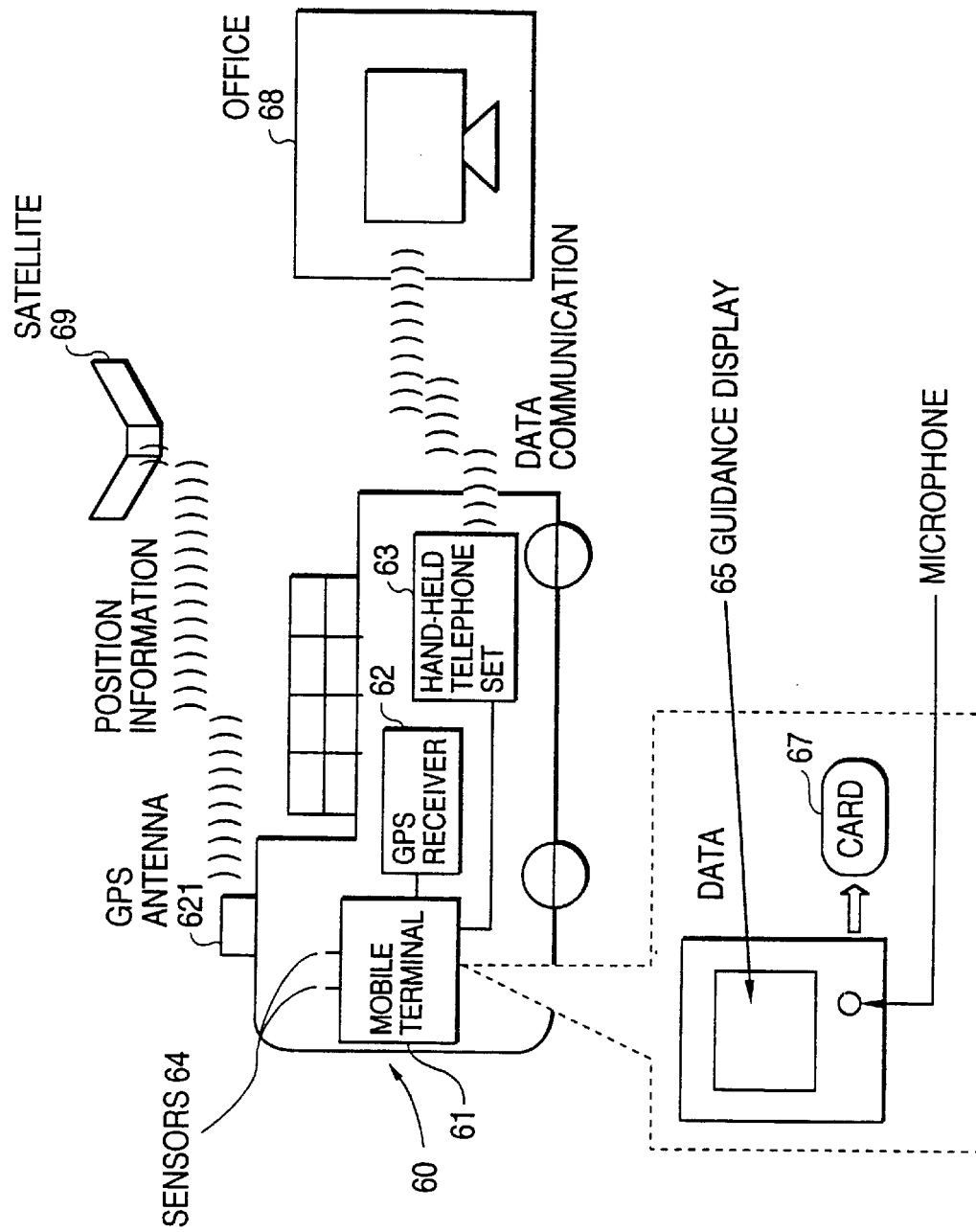
FIG. 6 is a diagram illustrating the first embodiment of the vehicle operation management system.

FIG. 6 is a diagram illustrating a vehicle operation management system as an embodiment and a detailed diagram for explaining the operation of the mobile terminal while the vehicle is in operation. As shown in FIG. 6, a vehicle 60 is provided with a mobile terminal 61. The mobile terminal 61 may be fixed to the vehicle 60 or removably mounted to the vehicle 60. The mobile terminal is connected with a GPS receiver 62, a radio communication unit 63 such as hand-held telephone set and sensors 64 mounted to various areas of vehicle 60. Moreover, the vehicle 60 is also provided with a GPS antenna 621 for receiving the position information transferred from the GPS satellite 69 and the GPS receiver 62 detects and discriminates the current position of the vehicle depending on the received signal.

Moreover, the mobile terminal 61 is provided with a guidance display unit 65 for displaying guidance information for transferring work instructions to a driver and a microphone 66 used by the driver to input by voice the work performed. Moreover, the mobile terminal 61 is also provided with an IC card reader/writer (not illustrated) for loading an IC card 67 to be carried by a driver. Data communication is carried out through a radio communication unit such as a hand-held telephone set 63 between the mobile terminal 61 and office computer 68 for transmission of work instruction information, work report information and other pieces of information.

FIG. 7 is a diagram for explaining in detail the contents of a driver database 70. Each driver working for the office is given the ID No. for identifying individual drivers. Within the driver database, the drivers working for the office are managed using these ID numbers 73. In the driver database 70, the information 71 concerning the drivers themselves and corresponding information 72 concerning working conditions of each driver are stored.

As the driver information, the information including name of driver and class of driving license carried by a driver is stored corresponding to the ID number of each driver. The vehicle 60, which is driven by a driver, is restricted depending on the class of driving license carried by the driver. Therefore, the class of driving license of each driver is recorded in the driver database 70 so that the type or class of vehicle 60 to be driven by each driver can be identified. The class of driving license is used as the information for prohibiting a driver to drive the vehicle 60 of the class not corresponding to the driving license.

In the columns for storing work information 72, the date of working (driving) 721 and the ID number of vehicle 722 driven by the driver to perform the work are stored corresponding to the ID number of each driver. In FIG. 7, only the work instructions on the 31st of October is stored, for example, but the work information of each driver can be stored in the driver database 70 in units of month, year or any predetermined term. The term for recording the work information is not particularly restricted and the work information can be stored for the period required for the operation management.

For example, in FIG. 7, a driver given the ID number 1010 has the name "Hoshino" and the driver "Hoshino" has the license class to drive a vehicle 60 for "large size for special use". This driver information 81 is stored in the driver database 70. The driver "Hoshino" drove the vehicle 60 having the ID number 1010 during the period from 9 AM to 3 PM on 31st of October.

When it is required to know the working conditions of each driver for the purpose of labor management including the check of driving conditions of drivers, the necessary information such as working condition of each driver can be outputted by retrieving the driver database 70 of FIG. 7.

Figure 8:
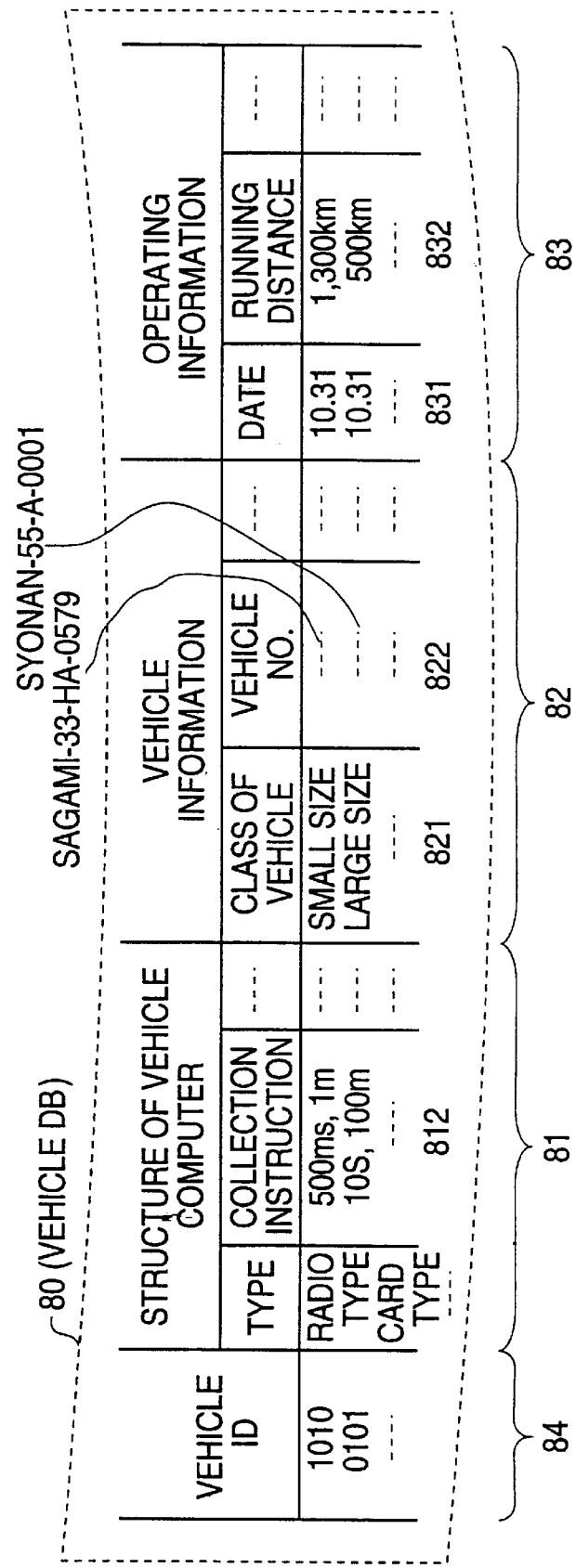
FIG. 8 is a diagram illustrating detailed information of a vehicle database.

FIG. 8 is a diagram illustrating details of the vehicle database 80. Each vehicle 60 assigned to the office is given an ID number. In the vehicle database 80, all vehicles 60 are administrated using their ID numbers. The vehicle database 80 stores the vehicle computer information 81 indicating a type of vehicle computer (mobile terminal) 61 mounted in the vehicle 60, vehicle information 82 concerning the vehicle 60 itself and operating information 83 concerning the operating condition of each vehicle 60, corresponding to the ID number of each vehicle 60.

In the column for storing the vehicle computer information 81 concerning the structure of mobile terminal 61, the vehicle computer information 81 indicates a type of the mobile terminal 61 mounted in the vehicle. For example, a radio type mobile terminal 61 is mounted into the vehicle given the vehicle ID number 1010. This vehicle is capable of transferring various pieces of information to the office by radio. Moreover, it can also be understood that a card type mobile terminal 61 is mounted in the vehicle given the ID number 0101 and transfer of data to the vehicle computer 61 can be done using a medium such as an IC card 63.

In addition, in the column 81 for storing the information concerning the structure of mobile terminal 61, the information concerning instructions for collecting information is stored.

The mobile terminal 61 collects, during operation of vehicle 60, the information concerning the traveling distance of vehicle 60 and running speed at the collecting time. This information collection is executed at a preset time interval or each time when the vehicle 60 travels for a predetermined distance. An "instruction for collection" stored in the vehicle database 80 indicates a time interval and travelling distance for collecting such vehicle operation information (work information).

For instance, for the vehicle 60 given the ID number 1010, collection of work information is carried out in every passage of 500 ms or in every 1.0 m traveled. Here, the numerical data of 500 ms and 1.0 m has been applied conforming to the information collecting interval in the existing method for collecting the information such as traveling distance with a tachometer.

Moreover, for the vehicle 60 given the ID number 0101 collection of information is carried out every 10 seconds or in every 100 m travelled by the vehicle. In the column of vehicle information 82 of the vehicle database 80, class of vehicle and vehicle number, etc. are stored. In the column of the operating information 83, the date and time of operation, travelling distance and other necessary information are stored. As explained above, other information including, for example, travelling route of vehicle and fuel consumption of vehicle can be listed. In FIG. 8, only the information of 31st of October is written as the operating information but the operating information generated during a month, a year or any other term may be stored as the term for recording information in the driver database 80.

In FIG. 8, it is also recorded that the vehicle 60 having the ID number 0101 is a large size vehicle given the vehicle number SYONAN-55-A-0001 and this vehicle has traveled 500 km during its work on 31st of October. It is further recorded that the vehicle 60 having the ID number 1010 is a small size vehicle given the vehicle number SAGAMI-33-HA-0579 and this vehicle has traveled 1300 km. Similar pieces of information are also recorded for the other vehicles 60. The operating conditions of each vehicle 60 can be detected by retrieving vehicle database 80 to collect necessary information such as operation information and necessity of maintenance. The vehicle's condition can be judged based on the collected data.

For example, the vehicle 60 is judged as to whether maintenance work is required based on the traveling distance by reading the total traveling distance thereof from the vehicle database 80. Moreover, the operating condition of each vehicle 60 can be retrieved from the vehicle database 80 and it is possible to discuss a more effective operating schedule based on the operating conditions of the vehicle.

As will be explained later, since the route travelled by the vehicle 60 and the time required for driving each vehicle 60 are also recorded in the vehicle database 80, the route of a vehicle 60 can also be discussed to realize more effective operation of the vehicle 60.

Figure 9:
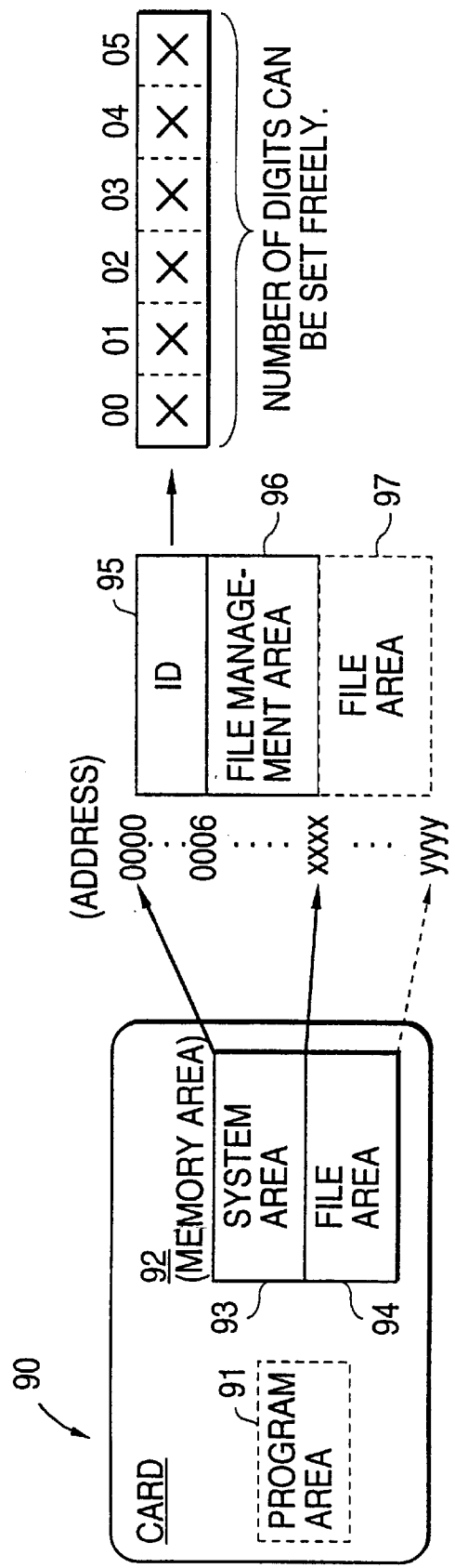
FIG. 9 is a diagram illustrating an example of an ID card, which a driver carries (memory configuration of driver ID).

FIG. 9 is a diagram illustrating an example of the IC card 90 carried by a driver including a memory. In the vehicle operation management system of this embodiment, an IC card 90 is given to each driver. When a driver tries to drive a vehicle 60, the driver is requested to insert the IC card 90 into the IC card reader/writer of the mobile terminal 61. The ID number of the driver is decisively recorded in the IC card 90. Therefore, the driver, who is driving the vehicle 60, can be determined by reading the driver ID number from the IC card 90.

As shown in FIG. 9, the memory of the IC card 90 is roughly classified into the program area 91 and memory area 92. In the program area 91, a program for operating the IC card 90 is stored. The memory area 92 is further classified into a system area 93 and a file area 94. The system area 93 stores the intrinsic driver ID number 95. This driver ID number 95 is given, as shown in FIG. 9, by a six digit numeral but the number of digits can be selected freely.

The system area 93 is further provided with a file management area 96 for storing file management information. The file management area 96 is capable of storing information concerning file name, address of file area for storing a file, size of file, length and size of each record, etc. Moreover, the file area 94 stores the work instruction information and the information concerning work and operation collected by the mobile terminal 61.

In the case of the existing contact type IC card, electrodes are exposed at the card surface. In the case of the work performed by the driver or crew utilizing a vehicle 60, particularly the work for picking up or distributing goods, a vehicle 60 is placed under the worst environmental conditions. Therefore, if the contact type IC card is used for the vehicle 60 placed under the worst conditions, the IC card may be often subjected to undesirable conditions such as contamination of electrodes of IC card and breakdown of IC card itself due to water or static electricity. Therefore, it is not recommended to use the contact type IC card.

In this embodiment, a non-contact type IC card 90 for transmitting or receiving information by radio to or from the card reader/writer is used as the IC card 90. The electrodes are not exposed at the surface of the non-contact type IC card 90. Therefore, this non-contact type IC card 90 is superior to the contact type IC card in the dust-proof and water-proof characteristics. In other words, the non-contact type IC card 90 is recommended as the IC card used for the vehicle operation management system applied under the worst environmental conditions as explained above. However, when the mobile terminal 61 is not used under worst environmental conditions, the existing contact type IC card may be used.

Figure 10:
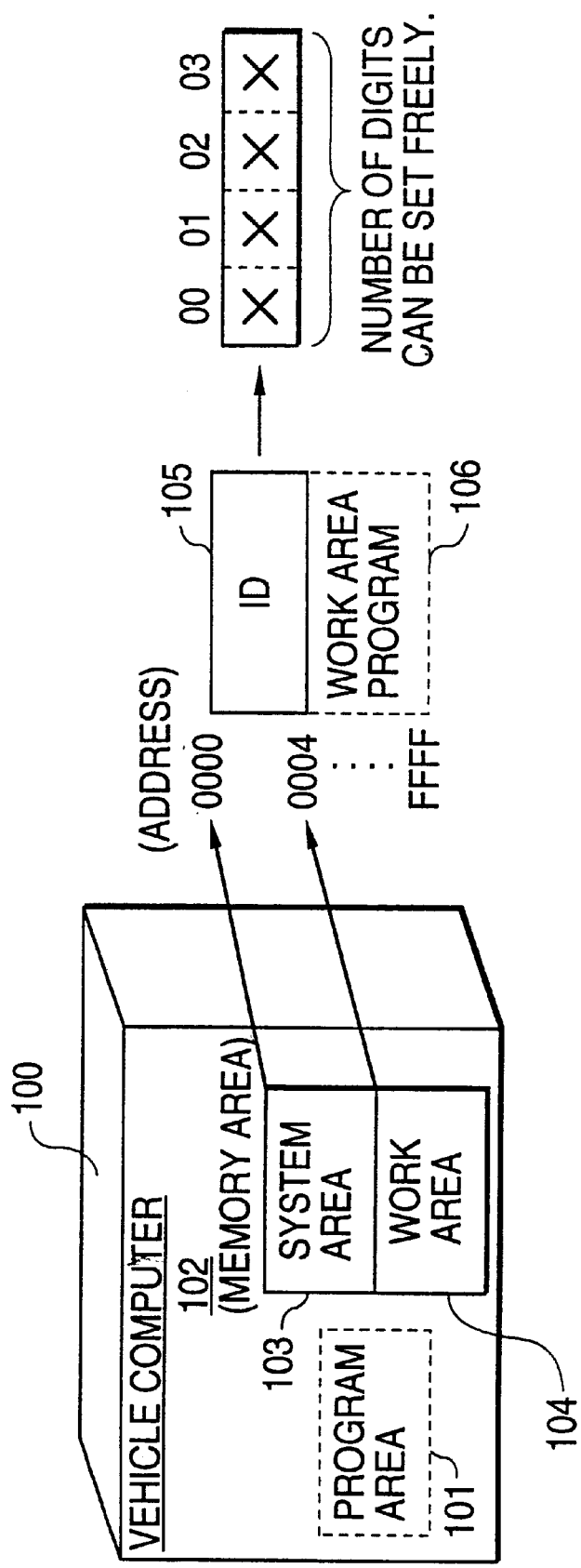
FIG. 10 is a diagram illustrating the memory configuration of a vehicle ID as stored in a mobile terminal.

FIG. 10 is a diagram illustrating a mobile terminal (vehicle computer) 100. As already explained, the mobile terminal 100 is decisively given the intrinsic vehicle ID number. The interior of the mobile terminal (vehicle computer) 100 is roughly divided into a program area 101 and a memory area 102. In the program area 101, a program for operating the mobile terminal 100 is stored.

The memory area 102 is further classified into a system area 103 and a work area 104. In the system area 103, the vehicle ID number 105 explained above is stored, for example, in the form of 4 numerical digits. The number of numerical digits in the ID number can be changed freely, for example, and the actual number can be selected freely. Moreover, a work area program 106 is stored in the work area.

Figure 11:
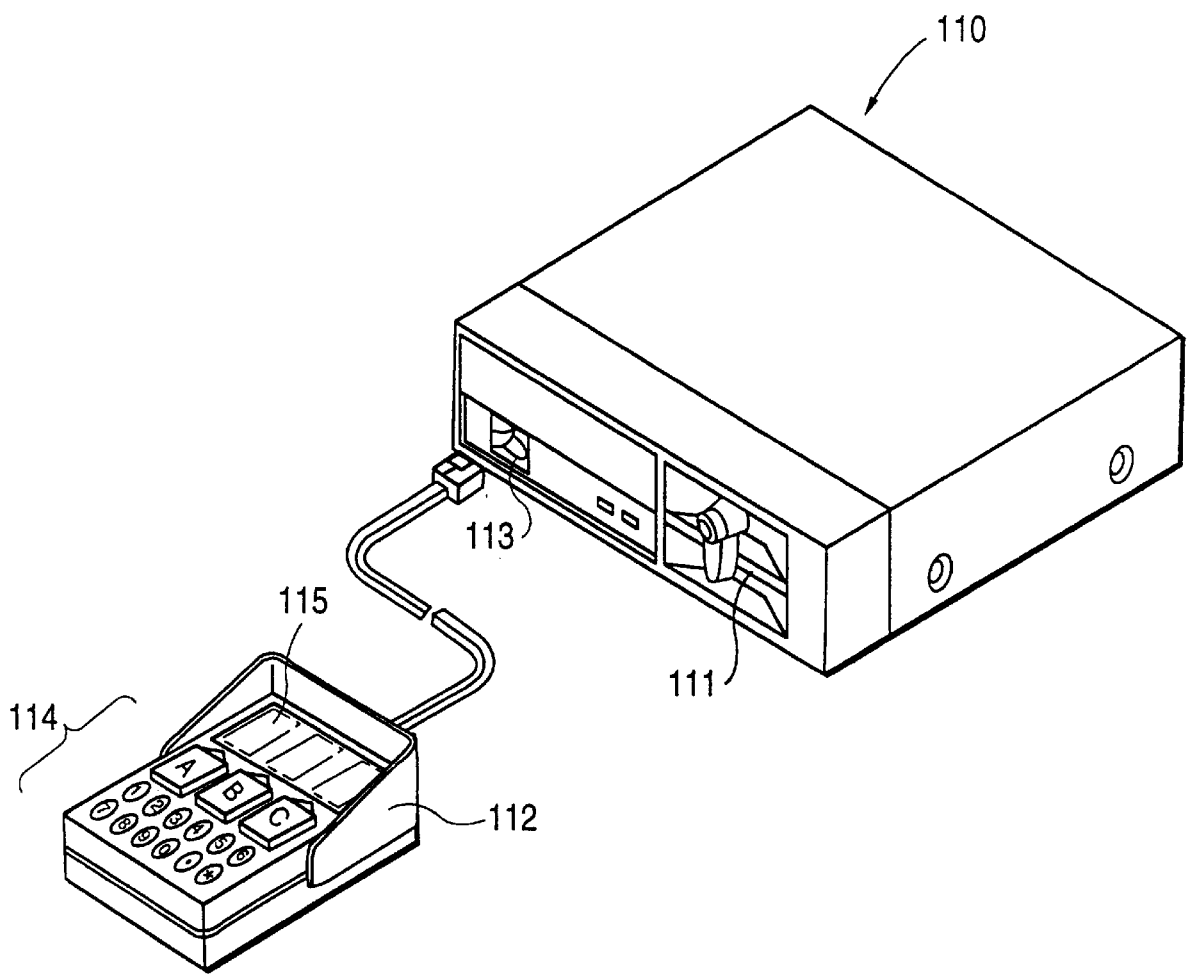
FIG. 11 is an external view of an example of a mobile terminal.

FIG. 11 is an external view illustrating an example of a mobile terminal. The mobile terminal 110 shown in FIG. 11 is an example of the card type terminal providing the IC card reader/writer. In the front surface of the mobile terminal 110, an IC card slot 111 is provided and the IC card carried by the driver is inserted into the mobile terminal 110 therefrom. Moreover, the mobile terminal 110 is also provided with a connector 113 for connecting and interfacing with a keypad 112. The keypad 112 shown in FIG. 11 is provided with a plurality of keys 114. In the keypad shown in FIG. 11, the numerical keys for inputting numerals from 0 to 9, and three keys A, B and C are provided. Using these keys 114, various kinds of numerals and various pieces of information can be inputted as required.

A display 115 is also provided in the keypad 112. Various pieces of information are displayed as required on this display 115 in order to display work instruction information for the driver and a message for urging the driver to input work performed or work to be performed is also displayed on this display 115. A message for checking the information inputted from the keypad 112 is also displayed. The details of the use of the keypad 112 are explained later.

Figure 12:
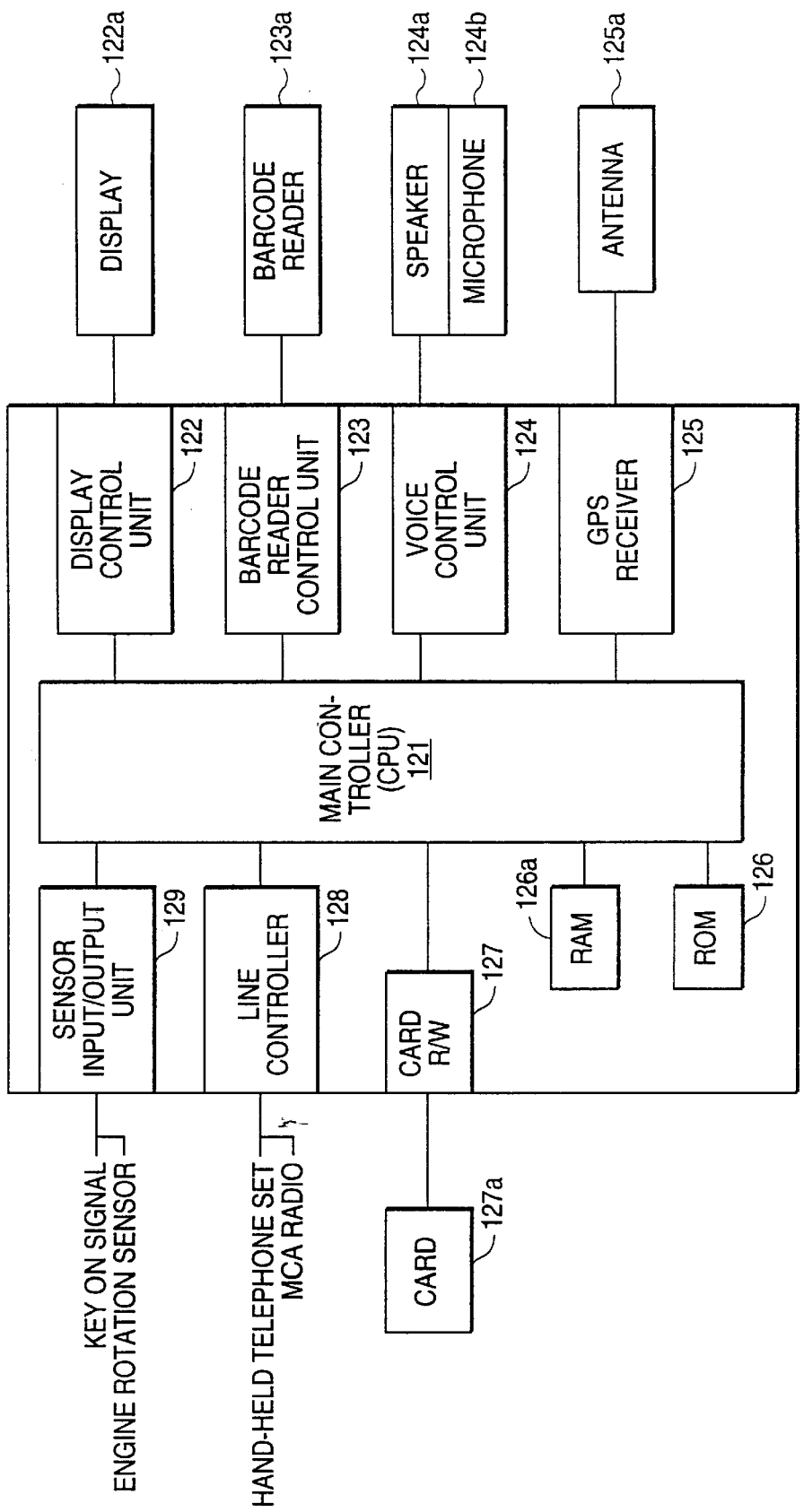
FIG. 12 is a diagram illustrating internal components of a mobile terminal.

FIG. 12 is a diagram illustrating a mobile terminal 120. The mobile terminal 120 includes a CPU or main controller 121, which is composed, for example, of a microprocessor to control operations of the mobile terminal 120. The mobile terminal 120 further includes a display control unit 122 for controlling the drive of the display 122a; barcode reader control unit 123 for controlling operations of the barcode reader 123a when the barcode reader 123a is connected to the mobile terminal 120; voice control unit 124 for controlling operations of a loud speaker 124a or microphone 124b provided on the mobile terminal 124 in which the speaker 124a is used for notifying the driver of information such as guidance with an audible voice, while the microphone 124b is used by the driver for inputting an audible instruction to the mobile terminal 120; and a GPS driver (receiver) 125 connected with GPS antenna 125a. The GPS receiver 125 is provided for collecting the current position including latitude and longitude of a vehicle 60 based on the signal received from the satellite 69 and the current time. The details of operations using GPS will be explained later.

In the ROM 126, a program for controlling the mobile terminal 120 and the vehicle ID number are stored. A card reader/writer 127 is provided for loading of the IC card 127a as explained previously to read information stored in the IC card 127a and write information generated in the mobile terminal 120 to the IC card 127a. A line controller 128 is connected, for example, with a hand-held telephone set or MCA radio for exchange of information between the mobile terminal 120 and office computer (not shown) through these devices. A sensor input/output unit 129 into which various signals from sensors, such as a key on/off signals for detecting the on/off states of vehicle key and an output signal from the engine rotation sensor for detecting the rotating condition of engine, are inputted. A RAM 126a is provided for temporary storage of information.

A CPU 121 judges conditions of various points of the vehicle depending on the signals from sensors received via the sensor input/output unit 129. The details of the vehicle conditions based on the sensor output will be explained later.

Figure 13:
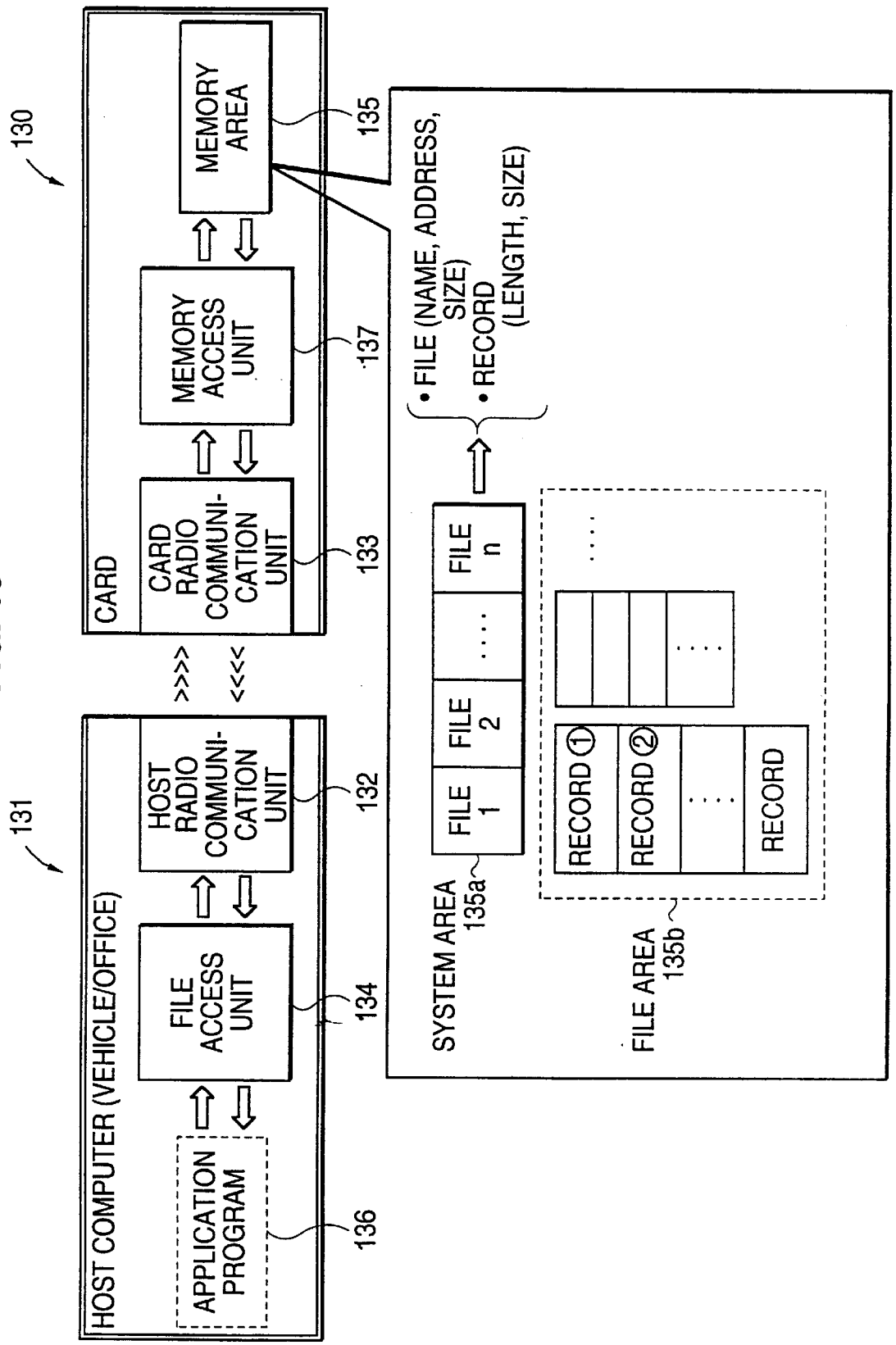
FIG. 13 is a diagram for explaining an example of an IC card file management method.

FIG. 13 is a diagram for explaining an example of the file management memory and method of an IC card 130. In the IC card 130, the memory area 135 is divided into the system area 135a and file area 135b. FIG. 13 explains the memory management of the IC card 130. In this embodiment, a radio (non-contact) type card is used as the IC card 130. Therefore, the information exchange between the host computer (such as an office computer) or mobile terminal 131, and the IC card 130 is executed via radio communication units 132, 133 respectively. The radio communication units use a low level signal for transmission and reception of data.

A file access unit 134 of the host computer 131, for example, accesses the file area 135b of the IC card 130 to read and write the data based on the information recorded in the system area 135a of the IC card 130. The file access unit 134 accesses the memory area 135 of the IC card 130 based on the instruction in the application program 136.

The IC card 130 is further provided with a memory access unit 137 for reading and writing the data to and from the memory area 135 of the card based on the physical address. As shown in FIG. 13, the memory area 135 is divided into the system area 135a and file area 135b. The system area 135a is further divided into a plurality of files to store the information about length and size of record together with file name, file storing address and size of file, etc.

The file area 135b is divided corresponding to respective files indicated in the system area 135a. Each file is further divided into a plurality of records and each record stores data. For the access to the memory area 135, access is first made to the system area 135a to access the file area 135b corresponding to the system area 135a. Access is made to the file area 135b in units of record.

Next, a vehicle operation management method utilizing this vehicle operation management system will be explained.

Figure 14:
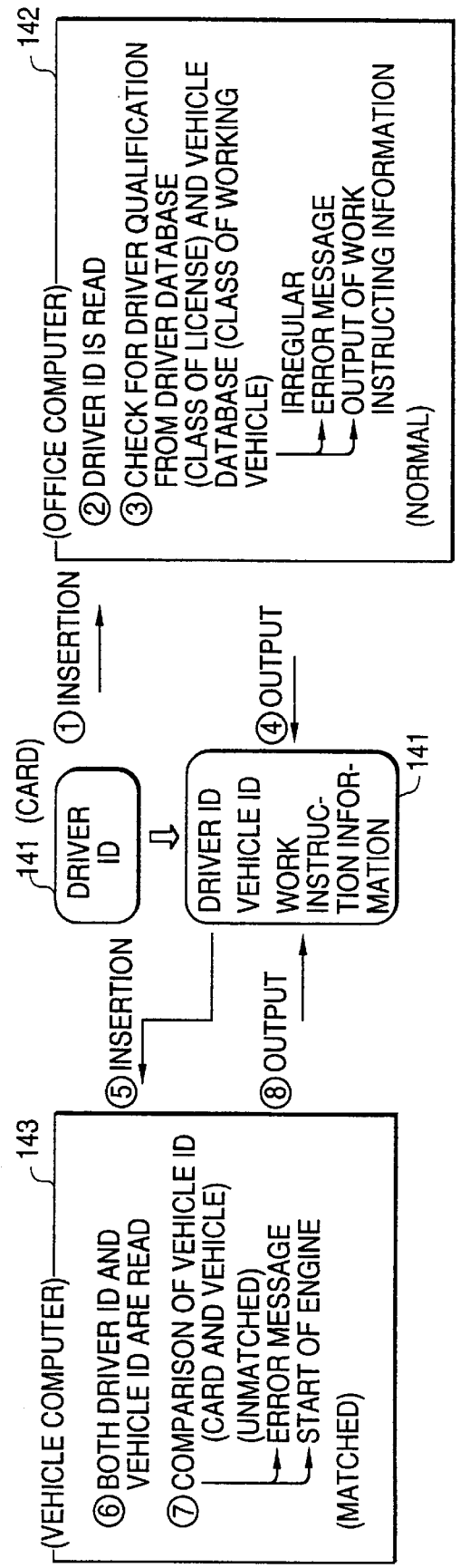
FIG. 14 is a diagram for explaining procedures required before the vehicle leaves the office.

FIG. 14 is a diagram for explaining the procedures required before the vehicle 60 leaves the office. A mobile terminal or vehicle computer 143 utilizing the IC card 141 is mounted in the vehicle 60. Before a vehicle 60 leaves the office, (1) a driver loads his own IC card 141 into the card reader/writer of the office computer 142; (2) the office computer 142 reads the driver ID number recorded in the IC card 141; (3) the office computer 142 retrieves the driver database based on the driver ID number obtained to read a class of driving license corresponding to the driver ID number obtained; (4) next, the office computer 142 retrieves the vehicle database based on the vehicle ID number of the vehicle to be used by the driver on that day to read the class of vehicle 60 in order to check the qualification of driver by collating the class of vehicle 60 with the retrieved class of driving license. When the class of vehicle does not match the class of driving license as a result of qualification check, the office computer 142, without entry of any information, issues a message indicating occurrence of an error and outputs the IC card 141. Therefore, a driver, who cannot drive a vehicle 60 with his driving license, is prevented from driving the vehicle 60.

When the class of vehicle 60 matches the class of driving license as a result of a qualification check, the office computer 142 writes the work instruction information corresponding to the driver ID number obtained from memory into the IC card 141 and thereafter outputs the IC card 141.

The work instruction information of each driver on that day is previously registered into the office computer 142 and the work instruction information of each driver can be read based on the driver ID number.

(5) The IC card 141 outputted from the office computer 142 is inserted by the driver into the mobile terminal (vehicle computer) 143. (6) When the IC card 141 is inserted, the mobile terminal 143 reads the driver ID number and vehicle ID number from the IC card 141 and (7) compares the vehicle ID number read from the IC card 141 with the vehicle ID number stored in the mobile terminal 143. When these ID numbers are matched, the mobile terminal 143 starts ignition of engine. If these ID numbers are not matched, the mobile terminal 143 judges that the driver is different from the driver scheduled on that day and issues an error message. In any case, (8) the IC card 141 is output after a comparison of the driver ID numbers.

Since there was a check as to whether the class of driving license of driver corresponds to the class of vehicle 60, as will be explained later, when the IC card 141 is inserted into the card reader/writer of the mobile terminal 143 and ignition of engine starts, the qualification check for driver and vehicle 60 can be omitted because the work instruction information is written into the IC card 141. In this case, it is possible that the driver ID number is read from the IC card 141 when the card is inserted to the card reader/writer of the office computer 142 and the IC card 141 is outputted after the work instruction information corresponding to the obtained driver ID number is written onto the IC card 141.

Figure 15:
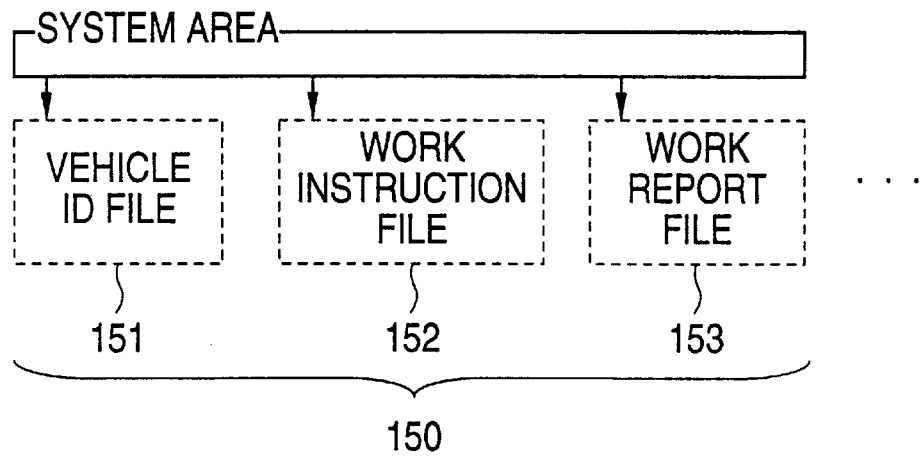
FIG. 15 is a diagram for explaining the work instruction information recorded on the IC card.

FIG. 15 is a diagram for explaining the work instruction information recorded on the IC card 141. The vehicle ID file 151, work instruction file 152 and work report file 153 are set in the file area 150 of the IC card 141. The ID number of the vehicle 60 driven by the driver is written in the vehicle ID file 151 by the office computer 142. Moreover, the work to be performed that day by the driver is written in the work instruction file 152 by the office computer 141. The work instruction information, maybe a message instructing, for example, "Distribute goods to the point A to the point B at 0: 0 (time) of 0, 0 (date and month). The work instruction information stored in the IC card 141 is not limited to only one instruction or task. When a plurality of tasks are required in a single driving route, required work instruction information is completely written in the work instruction file 152.

As will be explained later, the work report file 153 is used for recording the information such as traveling distance, travel route and the time used which have been obtained as a result of work. Moreover, the work report file 153 also stores the collection instruction data for indicating the time interval for collecting information explained above. The collection instruction data is written in the IC card 141 by the office computer 142 together with the work instruction information.

Figure 16:
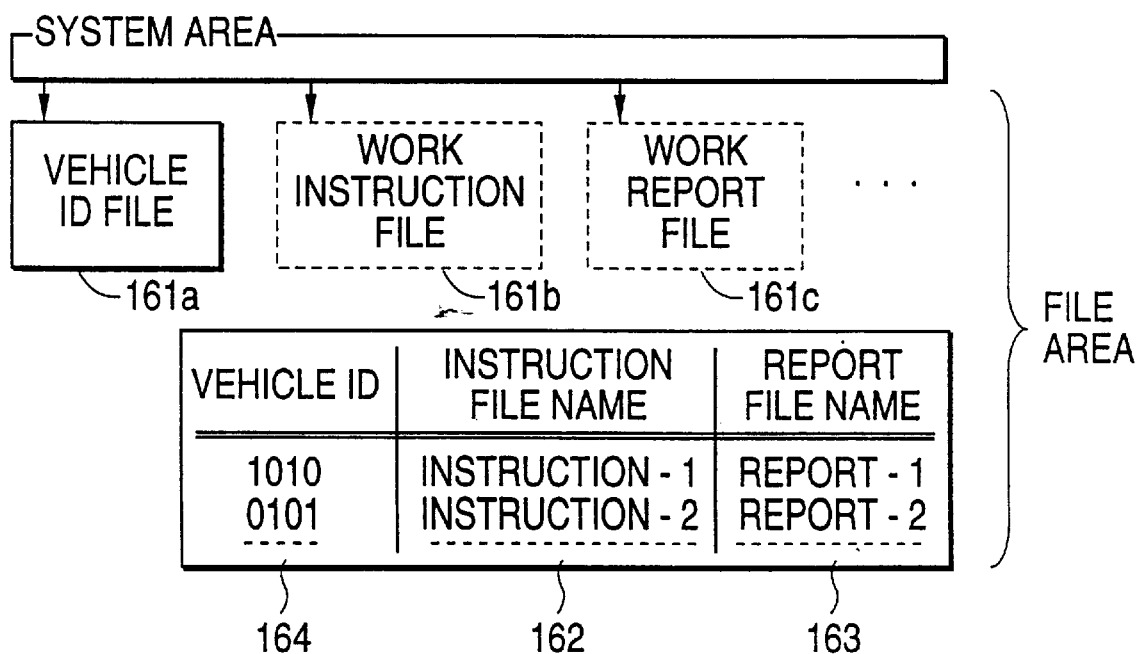
FIG. 16 is an example of the structure of a vehicle ID file where a plurality of vehicle ID numbers.

In addition, in some cases, a driver changes vehicles during a day. In view of solving this problem, a plurality of vehicle ID numbers can be stored in the vehicle ID file 161a as shown in FIG. 16. A plurality of instructions corresponding to vehicle ID numbers can be stored in work instruction file 161b. A plurality of work reports corresponding to vehicle ID numbers can be stored in work report file 161c. The work instruction file name 162 and work report file name 163 corresponding to each vehicle are respectively stored corresponding to the respective vehicle ID number 164. The driver inserts the IC card 141 outputted from the office computer 142 to the mobile terminal 143 (card reader/writer connected to the mobile terminal) of the vehicle to be driven. In this embodiment, engine start and stop of a vehicle are controlled from the IC card 141 carried by the driver. Operations for starting the engine will be explained hereunder.

Figure 17:
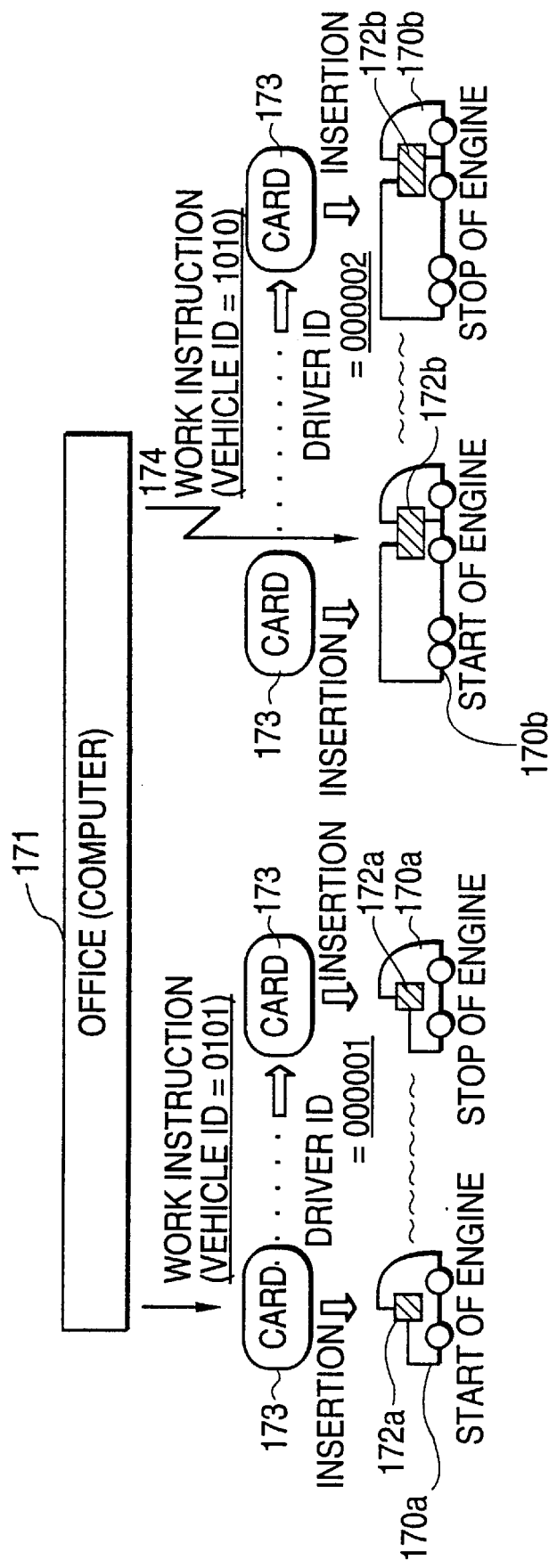
FIG. 17 is a diagram for explaining outline of the engine start/stop operation of vehicle.

FIG. 17 is a diagram for explaining an outline of the engine start and stop operations of a vehicle. Before starting the engine, the work instructing information is sent, together with the vehicle ID number, to the mobile terminal 172 from the office (computer) 171 via the IC card 173 or depending on the instruction 174 by radio. Engine start or stop is controlled with insertion of the IC card 173. When the IC card 173 on which the vehicle ID number is written as a part of the work instructing information by the computer 171, the mobile terminal 172a mounted on the vehicle 170a reads, with the sequence indicated in FIG. 14, the driver ID number and vehicle ID number recorded in the IC card 173. When a driver is scheduled to change a plurality of vehicles as shown in FIG. 16, the vehicle ID numbers and several pieces of work instructing information corresponding to a plurality of vehicles are stored in the IC card 173. In this case, the mobile terminal 172a confirms whether the vehicle ID number on the IC card 173 matches with the vehicle ID number stored in the memory of the mobile terminal 172a by referencing the respective vehicle ID numbers.

Next, the vehicle ID number read from the IC card 173 is collated with the vehicle ID number stored in the mobile terminal. When there is no match, the mobile terminal 172a determines that the driver having the relevant IC card 173 is not scheduled to drive the relevant vehicle 170a and outputs the IC card after issuing an error message.

On the other hand, when the vehicle ID number stored in the IC card 173 matches the vehicle ID number stored in the mobile terminal 172a, the mobile terminal 172a starts the ignition of the engine. Here, it is also possible to output the IC card 173 from the mobile terminal 172a when matching of ID numbers is determined.

Moreover, upon ignition of the engine, the mobile terminal 172a reads the work instructing information and collection instructing data written in the IC card 173 to write the work instructing information into the work instruction file of the mobile terminal 172a and also stores the collection instructing data to the predetermined area of the work report file. Thereafter, the mobile terminal 172a collects various pieces of information with the interval instructed here by referencing the collection instructing data stored in the work report file.

With the constitution explained above, incorrect use of vehicles of the office by the driver not scheduled or theft of vehicles by a third party can be prevented. Thereby, management of the vehicles can be realized more effectively.

In the case of the vehicle 170b where the radio mobile terminal 172b is mounted, the vehicle ID number inputted to the mobile terminal 172b with the IC card 173 is transmitted by radio from the office computer 171 together with the work instructing information. In this case, the mobile terminal 172b selectively receives the information including the vehicle ID number, which is the same as its vehicle ID number. When the radio mobile terminal 172b is used, the IC card 173 is also inserted thereto.

Moreover, it is also possible to send the work instructing information and collection instructing data to the mobile terminal 172b from the computer 171 via the IC card 173.

Figure 18:
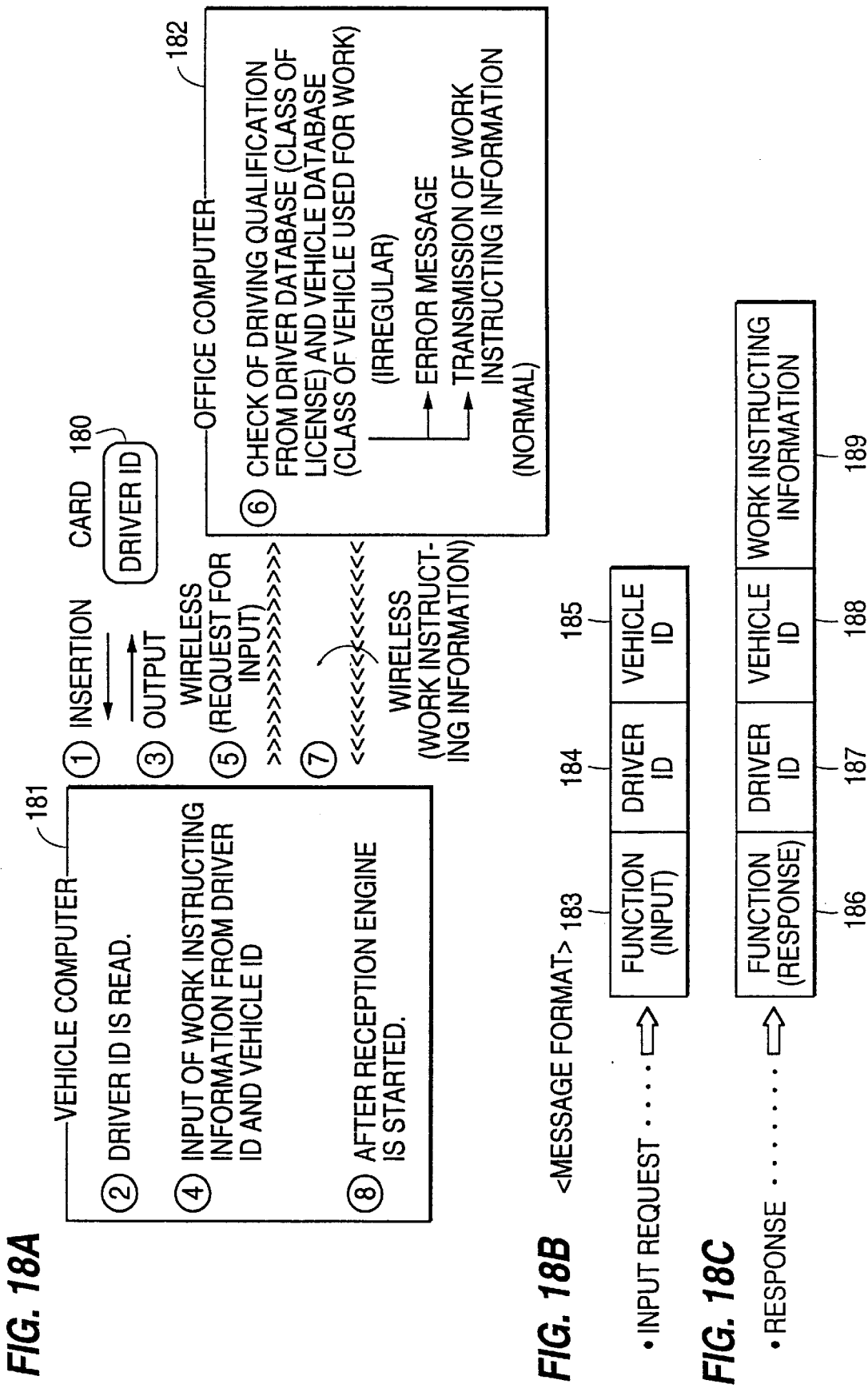
FIGS. 18A–18C are diagrams illustrating the processing procedures including the engine start operation required before the vehicle leaves the office when a wireless type mobile terminal is used.

FIG. 18A is a diagram indicating the processing sequence before the vehicle leaves the office including the engine start operation when the radio mobile terminal is used. In this case, information exchange is performed by radio between the mobile terminal (vehicle computer) 181 and office computer 182. For execution of security check of driver, the IC card 180 carried by the driver is inserted into the mobile terminal 181 in the example of FIG. 18A at the time of starting the engine.

The numeral given in the parentheses corresponds to the numerals given in FIG. 18A. For starting the engine, a driver inserts the IC card 180 storing the driver ID number into the card reader/writer of the mobile terminal 181 (1). The mobile terminal 181 reads the driver ID number from the inserted IC card 180 (2) and outputs the IC card 180 (3). Subsequently, the mobile terminal 181 transmits by radio the input request signal together with the driver ID number and vehicle ID number to the office computer 182 in order to request the office computer 182 to input the work instructing information of that day based on the driver ID number obtained and the vehicle ID number (4, 5).

An example of the input request signal is shown in FIG. 18B. The input request signal includes "Function" 183, driver ID number 184 and vehicle ID number 185. In the input request signal, a sign indicating that this signal is the input request signal is written in the column of the "Function" information and the input request signal is transmitted by radio to the office computer 182. Moreover, the driver ID number read from the IC card 180 is transmitted and the vehicle ID number is also transmitted.

The office computer 182 refers to the "Function" column 183 of the input request signal transmitted from the mobile terminal 181 and discriminates that this signal is the work instructing information input request signal. On the basis of the driver ID number and vehicle ID number transmitted, the office computer 182 retrieves the driver database and vehicle database (6). The computer 182 reads, from the driver database, the class of driving license of the driver having the transmitted ID number and also reads, from the vehicle database, the class of vehicle corresponding to the transmitted vehicle ID number. Moreover, the office computer 182 checks the qualification of the driver, who has loaded the IC card to the mobile terminal 181 based on the obtained class of driving license and the vehicle class information.

If the class of the driving license of driver does not match the class of vehicle, the office computer 182 generates an error and issues therefrom an error message to the mobile terminal 181. On the other hand, when the class of driving license of the driver matches the class of vehicle, the office computer 182 determines that the result of qualification check for driver is normal. In this case, the computer 181 sends by radio the work instructing information corresponding to the transmitted driver ID number to the mobile terminal 181 (7). The work instructing information is previously inputted to the office computer 182.

An example of the work instructing information is shown in FIG. 18C (response). The information transmitted into the mobile terminal 181 from the office computer 182 is composed of "Function" information 186, driver ID number 187, vehicle ID number 188 and work instructing information 189. In this case, a sign indicating that this signal includes the work instructing information is written in the "Function" column. Moreover, it is also possible to send the collection instructing information to the "Function"0 column in addition to the work instructing information. The mobile terminal 181 receives the work instructing information from the office computer 182 and stores this information into the predetermined area of memory and then starts the engine (8).

The engine start sequence is similar to that explained with reference to FIG. 14. Here, it is also possible that the mobile terminal 181 collates the driver ID number and vehicle ID number returned from the office computer 182 with those stored therein to discriminate whether the response signal received from the office computer 181 is directed thereto or not depending on matching or mismatching of such ID numbers.

Moreover, when the collection instructing data is not added to the transmitting information, to which the work instructing information is added, and therefore not transmitted to the mobile terminal 181 from the office computer 182, the mobile terminal 181 issues a request, before the engine starts, to the office computer 181 to transmit the collection instructing data to the office computer 181. In this case, the information in the format corresponding to FIG. 18C is transmitted from the computer 181, but the information indicating that the added information is the collection instructing data is written into the "Function" column and the collection instructing data is transmitted in place of the work instructing information.

Figure 19:
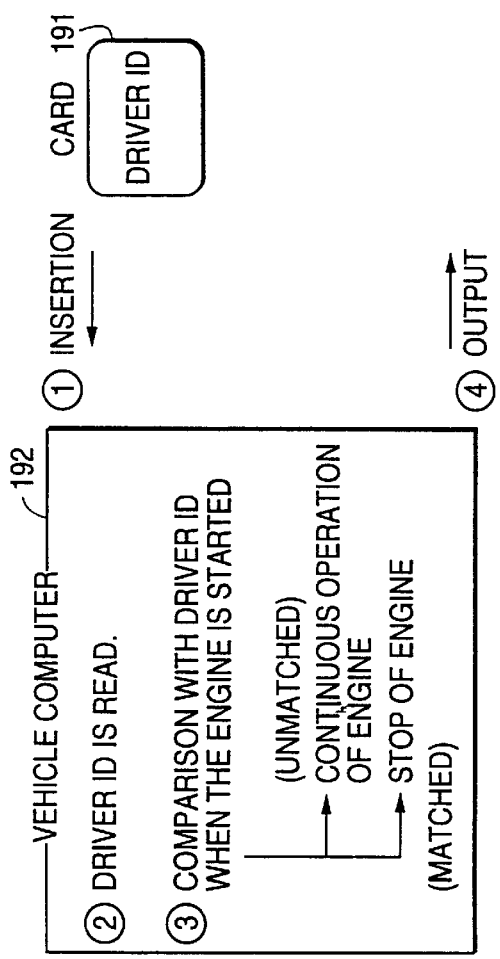
FIG. 19 shows processing procedures for stopping the engine of the vehicle.

FIG. 19 shows a processing sequence for stopping the engine. In the case of this embodiment, the processing sequence for stopping the engine is basically similar in the case of the card type terminal and radio type terminal.

The processing sequence will be explained with reference to FIG. 19. The numerals given in the parentheses correspond to those in FIG. 19. For stopping the engine, a driver inserts his or her IC card 191 into the mobile terminal or vehicle computer 192 (1). The mobile terminal 192 reads the driver ID number from the IC card 191 (2). Subsequently, the mobile terminal 192 collates the driver ID number read at the time of starting the engine with the driver ID number read now (3). The driver ID number read at the time of engine start is recorded in the mobile terminal 192 and is collated with the driver ID number read from the IC card 191. When two driver ID numbers are matched, the mobile terminal 192 determines the driver, who has inserted the IC card 191, is the qualified driver and then begins stopping the engine.

On the other hand, when two driver ID numbers do not match, there is a high probability that the driver who has started the engine is different from the driver who is trying to stop the engine. Therefore, in this case, the mobile terminal 191 does not allow the driver to stop the engine. In addition, the mobile terminal 192 outputs the IC card 191 after collation of two driver ID numbers (4).

With the control as explained above, only the qualified driver can stop the engine of the vehicle. If the vehicle is stolen while the vehicle is used (particularly when the engine is activated), the engine can no longer be stopped, which inconveniences a thief who is stealing the vehicle. When the engine is to be stopped, it is also possible to record the work report information generated during operation of vehicle which is already recorded in the mobile terminal 192 into the IC card 191.

Next, collection of the operating information such as various pieces of work report information generated during operation of the vehicle will be explained hereunder. When operation of a vehicle is started, the mobile terminal 192 collects various pieces of operating information to generate the work report information. As the operating information to be collected by the mobile terminal 192, work starting/ending times, traveling (moving) distance of vehicle, vehicle speed and route, etc. can be listed.

Figure 20:
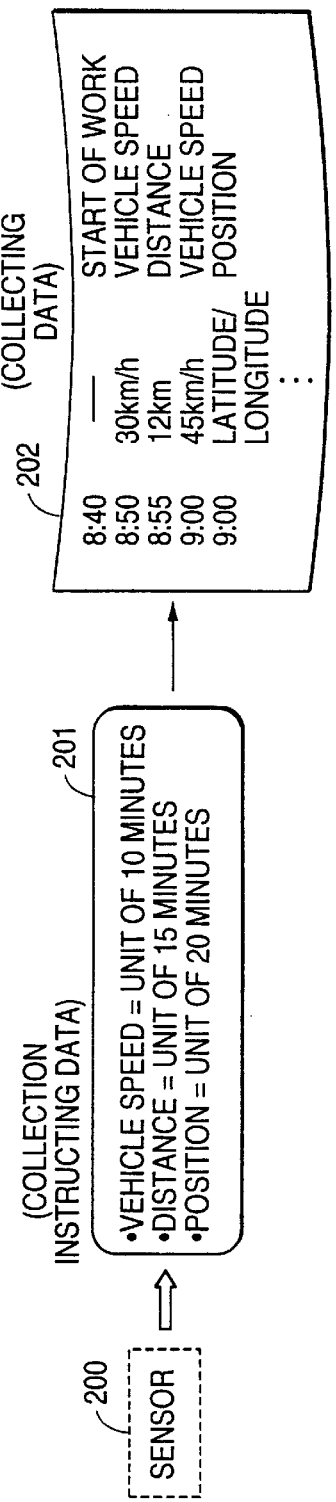
FIG. 20 is a diagram schematically illustrating the formats of the collection instructing data and collected operation information.

FIG. 20 is a diagram schematically illustrating the collection instructing data and format of the collected operating information. The work report information is composed of the collecting data 202. The collecting data 202 is collected by the sensor 200 based on the conditions indicated by the collection instructing data 201.

In an example of FIG. 20, the collection instructing data indicates the time interval for collecting information such as vehicle speed, traveling distance (hereinafter referred to only as distance), current position of vehicle (hereinafter referred to only as position). Here, vehicle speed is collected at predetermined time intervals, such as every passage of 10 minutes. Similarly, distance is collected in every time passage of 15 minutes, for example, and position in every time passage of 20 minutes, for example.

This time interval can be set freely. When course collection of information is necessary, the time interval can be set shorter than that in the example of FIG. 20. When rough collection of information is enough, the time interval for collection of information can be longer. In the case of the existing tachometer, information such as vehicle speed is collected at every 500 ms. Therefore, matching with the operating information collected by the existing tachometer can be obtained by setting the time interval for collection of information indicated by the collection instructing data 201 to 500 ms as in the case of the tachometer.

Figure 21:
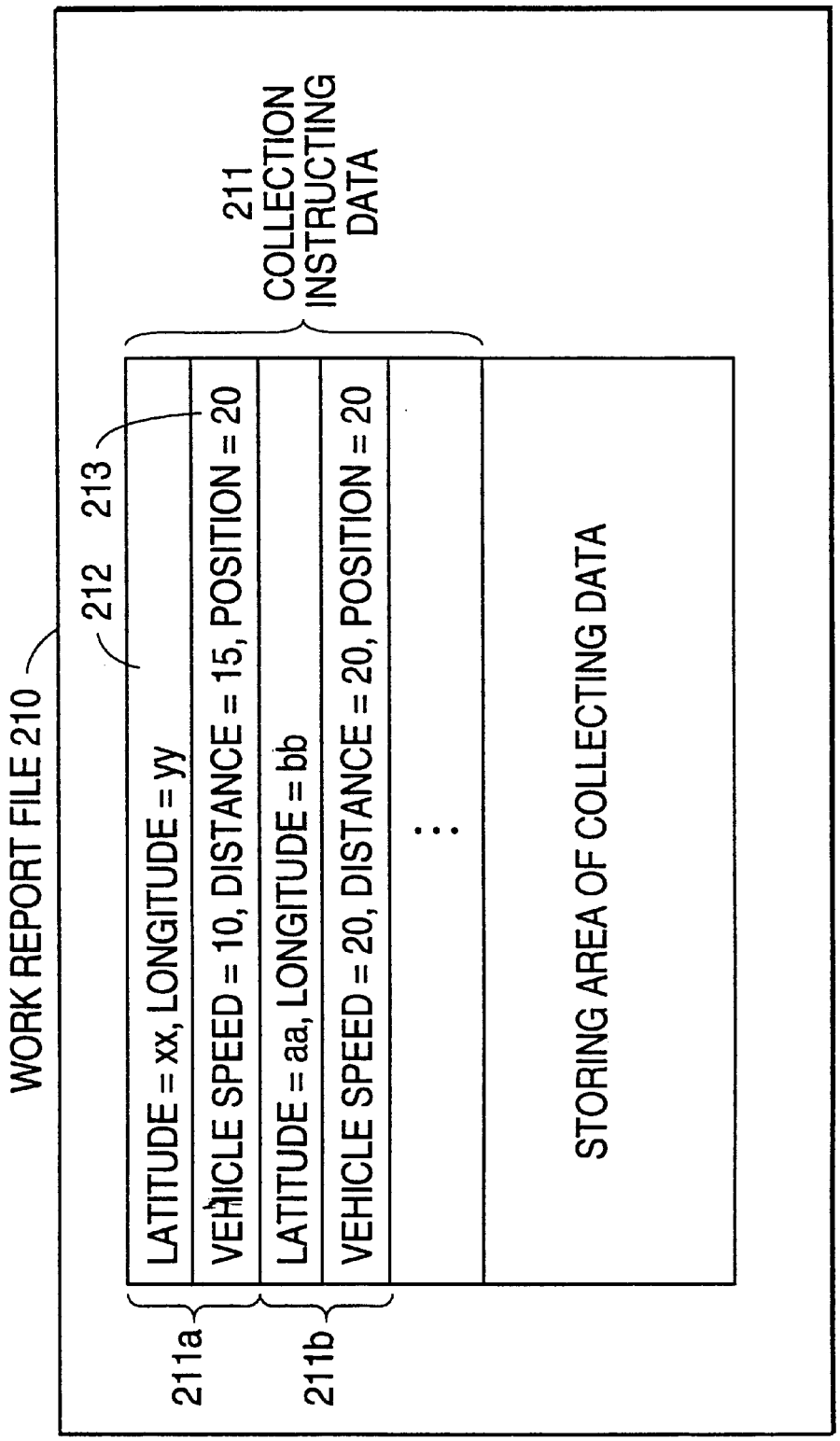
FIG. 21 is a diagram illustrating a constitution of a work report file for storing collection instructing data.

FIG. 21 is a diagram illustrating a work report file 210 for storing the collection instructing data.

The collection instructing data 211 is stored in the work report file 210 preset in the memory area of the mobile terminal 181. In the case of FIG. 21, collection instructing data 211 includes the latitude/longitude information 212 and time interval 213 for collecting the operating information such as vehicle speed, distance and position are recorded. The latitude/longitude information 212 will be explained later. Moreover, as shown in a vehicle database of FIG. 8, the collection time interval and collection distance are set as the collection instructing data 211.

Collection of information may be executed based on the time interval and/or moving distance. In FIG. 21, information has been collected based only on the time interval.

When both the time interval and moving distance are introduced for collection of information, priority of information collection is given to one condition, for example, to the time interval and the other condition, for example, the moving distance is considered as the secondary condition for the information collection. For instance, when moving distance of a vehicle is very small for a passage of time due to traffic congestion, etc., it is meaningless, in some cases, to collect information based on the instructed time interval. Therefore, when the vehicle does not move for the distance specified by the collection instructing data even after the predetermined time has passed, information is collected when the vehicle has moved for the predetermined distance specified by the collection instructing data 211.

On the other hand, various pieces of operating information collected based on the collection instructing data 211 are recorded, together with the time when the information has been collected, in the column of the storing area of the collecting data. In the example of FIG. 20, after the work has been started at 8:40 AM, vehicle speed is collected at 8:50 after passage of 10 minutes. In this case, the speed "30k/h" is recorded. At 8:55, after passage of 15 minutes from the start of work, the moving distance of vehicle is collected and the distance "12k" is recorded with the collecting time. As explained above, each piece of information collected in the time interval indicated by the collection instructing data 211 is recorded in the collecting data storing area of the work report file 210.

Next, an information collecting method will then be explained hereunder. Vehicle speed and moving distance of vehicle are collected through a sensor for measuring vehicle speed. A sensor for measuring vehicle speed is attached to a vehicle. The vehicle speed sensor generates and outputs the predetermined number of pulses for each rotation thereof. JIS (Japanese Industrial Standards) prescribes that the vehicle speed sensor speed should be attached to the rotating shaft which makes 637 rpm at the speed of 60 km/h. The vehicle speed and moving distance can be computed on the basis of this specification.

Traveling distance can be computed by the following equation.

$$\text{Traveling distance (km)} = \text{total number of pulses}/(637 \times \text{number of pulses}) \quad (1)$$

Here, "number of pulses" means the number of pulses generated when the vehicle speed sensor makes a turn.

Meanwhile, vehicle speed can be computed by the following equation.

$$\text{Vehicle speed (km/h)} = \text{Number of pulses/sec.} \times 3600/(637 \times \text{number of pulses}) \quad (2)$$

The vehicle speed and moving distance computed as explained above are recorded together with the information collecting time in the storing area of collecting data.

The current position of the vehicle can be obtained utilizing GPS (Global Positioning System). As is already explained above, the mobile terminal is provided with GPS driver for receiving a signal from GPS satellites. The GPS system can obtain the latitude and longitude based on the signals received from three GPS satellites. The mobile terminal used in this system detects and verifies the current position of vehicle utilizing such GPS system.

Moreover, various pieces of operating information are recorded at the collecting times. Here, it is also possible to collect the current time with a timer provided in the mobile terminal and this structure is most simple. However, since an error is generated to a considerable extent in the timer mounted in each mobile terminal, each timer probably has a different time display in the same time. Therefore, matching of the time information is lost between mobile terminals and accurate time information cannot be collected.

Particularly, the working time is computer based on the work starting time and work ending time. Here, the work starting time may be considered, for example, at the time when the vehicle leaves the office and the work ending time at the time when the vehicle has returned to the office. If such work starting time and work ending time cannot be collected, this probably results in various problems for computation of wage and introduction of labor management.

The mobile terminal in this embodiment utilizes the GPS also for collection of time information in order to prevent generation of various problems explained above. Since the time information is included in the GPS signal, the accurate time information can be collected, without depending on the timer installed in the mobile terminal, by collecting the time information from the GPS signal. The operating information collected from each vehicle can be managed at each united time by recording in pair the time information collected as explained above with the operating information. The operating information collected as explained above is stored in the work report file preset in the memory area of the mobile terminal.

Figure 22:
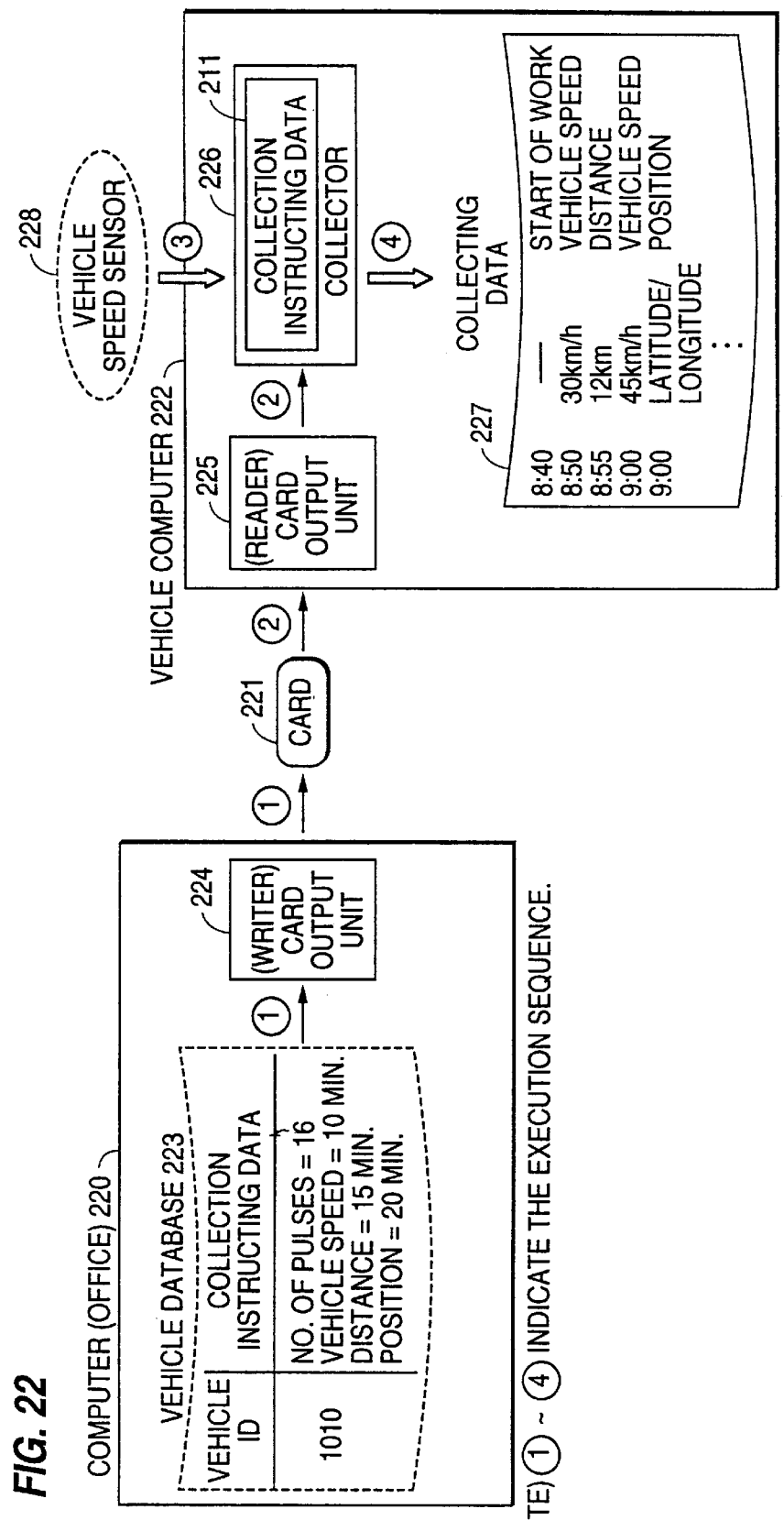
FIG. 22 is a diagram illustrating the down-load procedures of collection instructing data from a mobile terminal to a computer.

FIG. 22 is a diagram illustrating the down-loading procedures of collection instructing data 211 to the computer 220 from the mobile terminal (vehicle computer) 222. In this case, the computer 220 down-loads the collection instructing data 211 to the mobile terminal (vehicle computer) 222 using an IC card 221.

The collection instructing data 211 is stored, together with the respective vehicle ID numbers, in the vehicle database 223 preset in the office computer 220. As shown in FIG. 22, the collection instructing data 211, vehicle speed collecting time interval, moving distance collecting time interval and position information collecting time interval, etc. are set as explained previously. Moreover, in FIG. 22, the number of pulses is identical to the "number of pulses" indicated by the equation (1) or (2).

The collection instructing data recorded in the vehicle database 223 is written into the IC card 221 inserted into the computer 220 with a card output unit 224 before the driver leaves the office (1). When the driver inserts the IC card 221 into the mobile terminal 222 before he or she leaves the office, the card input unit 225 of the mobile terminal 222 reads the collection instructing data 211 from the IC card 221 and stores the collection instructing data 211 into the work report file 226 (2). Thereafter, the mobile terminal 222 collects operating information (3) by collecting, for example, the vehicle speed from the vehicle speed sensor 228 based on the collection instructing data 226a stored in the work report file and stores the result as the collecting data into the collecting data storing area 227 together with the time information (4).

Figures 23A, 23B:
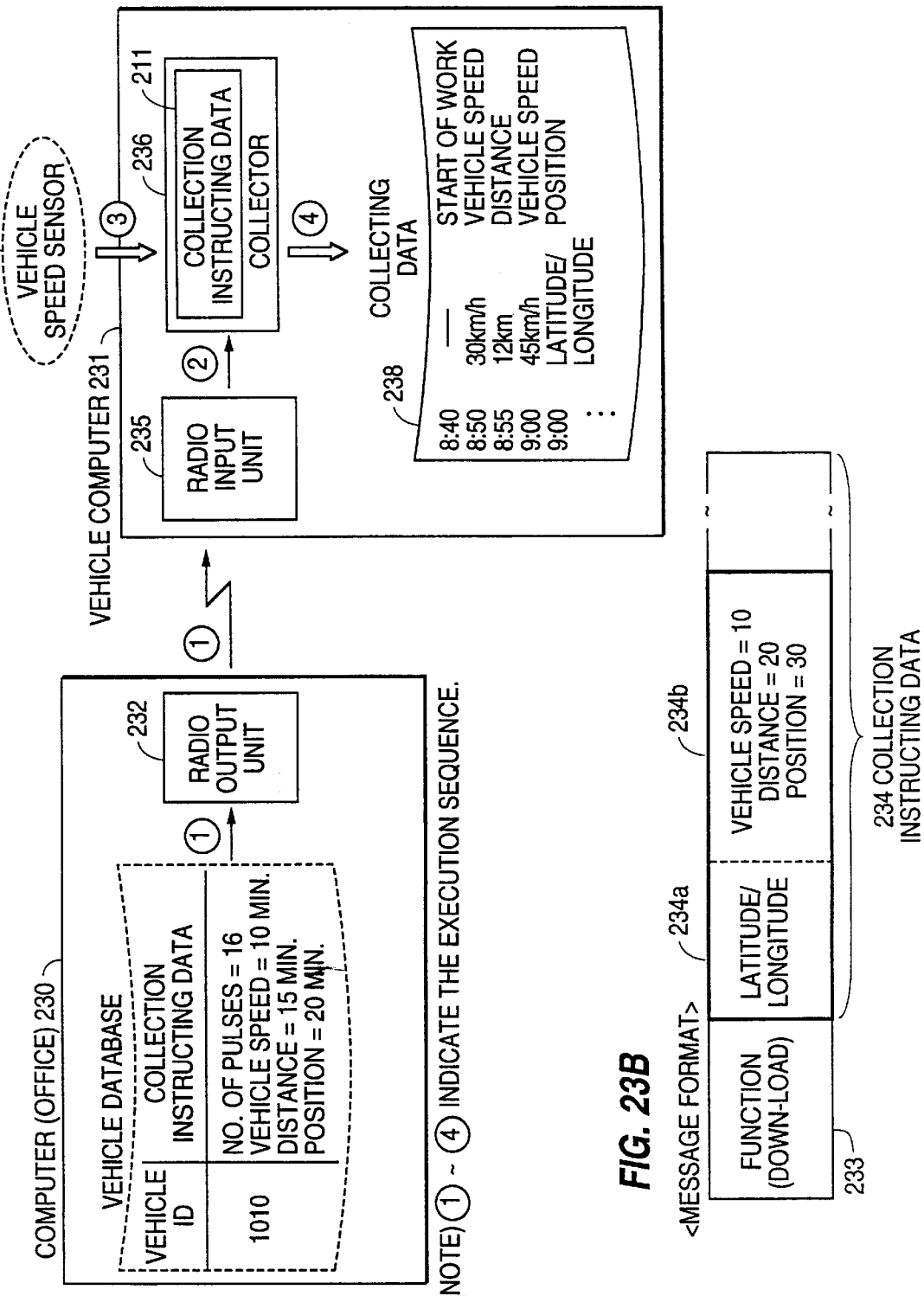
FIG. 23A and FIG. 23B are diagrams illustrating the down-load procedures of collection instructing data from the computer to the mobile terminal when a wireless type mobile terminal is used.

FIG. 23A is a diagram illustrating down-loading procedures of the collection instructing data to the radio type mobile terminal (vehicle computer) 231 from the office computer 230. In this case, a radio output unit 232 is provided in the office computer 220 to transmit information to the radio input unit of the mobile terminal (vehicle computer) 231. From the office computer 230, a message shown in FIG. 23B is transmitted.

A message transmitted from the office computer 230 is composed of "function" information 233 and collection instructing data 234. The collection instructing data is composed of "latitude/longitude" information 234a and vehicle speed/moving distance/current position collecting time interval 234b.

The mobile terminal 231 receives the message directed to itself from the radio input unit 235 and sets the collection instructing data 236a to the collector 236 of the work report file. Thereafter, depending on the condition indicated in the preset collection instruction data 211, various pieces of operating information are collected, for example, using the vehicle speed sensor 237 and the collecting data is then stored in the collecting data storing area 238 of the work report file. The collecting procedure itself is similar to that shown in FIG. 22.

The latitude/longitude information is recorded in the collection instructing data 211 together with the collecting time interval. Moreover, while the vehicle is being, operated, the mobile terminal 231 recognizes its own latitude and longitude using GPS system at the predetermined time or in every movement of predetermined distance. In this embodiment, when the vehicle position matches the latitude and longitude indicated by the collection instructing data 211 (or the vehicle is located within a certain range from the predetermined point), the collection instructing data 211 is replaced using the collected latitude and longitude.

Here, the office position is indicated, for example, by latitude xx and longitude yy in FIG. 21. After the vehicle has left the office, the collection instructing data 211 is set to the mobile terminal 231 so that the collection instructing data 211a including a pair of latitude and longitude of "xx, yy" is collected, that is, vehicle speed is collected with time interval of 10 minutes, moving distance with time interval of 15 minutes and vehicle position with time interval of 20 minutes.

When the vehicle has reached the position indicated by latitude aa and longitude bb (or in the vicinity of above position), the mobile terminal 231 replaces the collection instructing data 211b, wherein the collection instructing time interval is stored in pair of the latitude/longitude "aa, bb" instructing, in the case of FIG. 21, collection of vehicle speed with time interval of 20 minutes, moving distance with time interval of 20 minutes and vehicle position with time interval of 20 minutes, with the collection instructing data 211b which has been stored in the collector 236.

Figure 24:
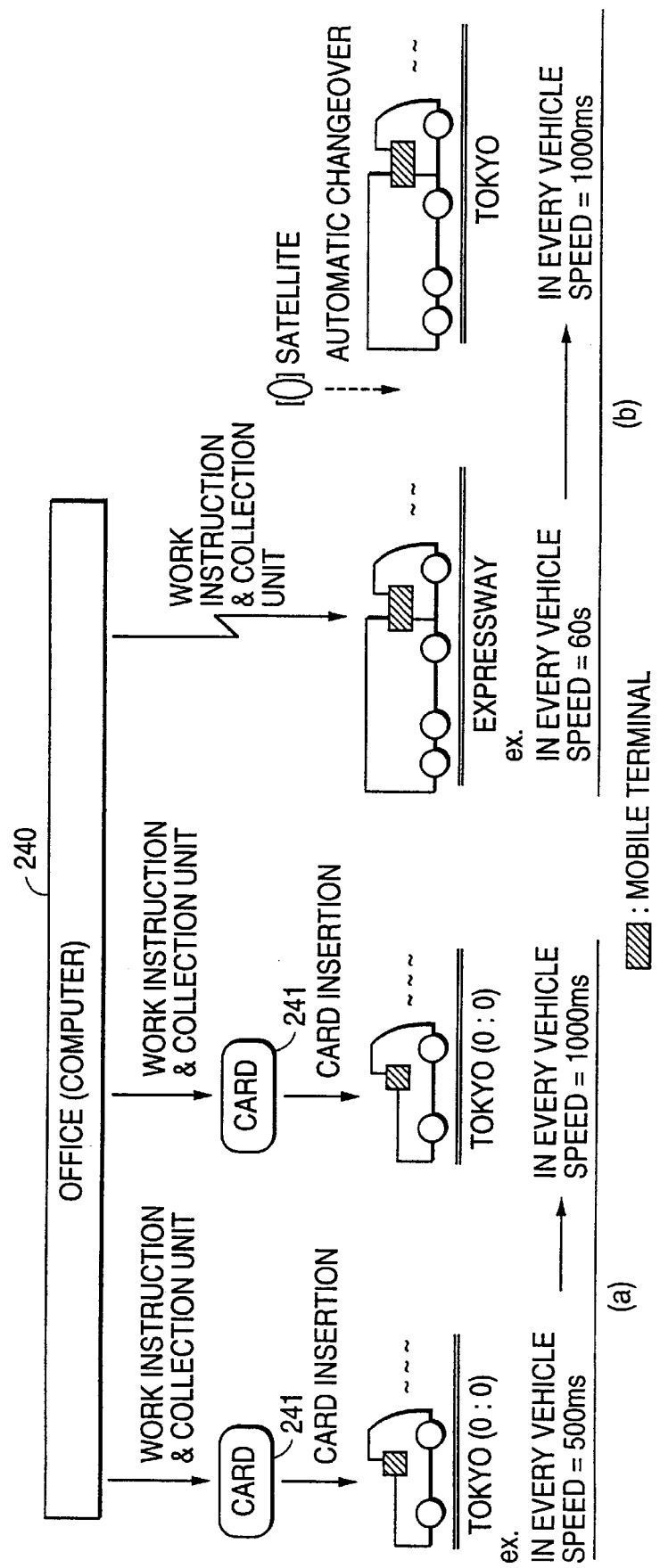
FIG. 24 is a diagram for explaining the reason for changing over the collection instructing data depending on the passing positions.

FIG. 24 is a diagram for explaining the reason for changing over the collection instructing data (collecting time interval) depending on the position of the vehicle. FIG. 24 indicates an example for changing the collecting time interval depending on the day, while FIG. 24 indicates an example for changing the collecting time depending on the position arrived. Changeover of the collection instructing data 211 explained above corresponds to that of FIG. 24 and the changeover of the collecting time interval depending on a day is basically identical.

In the case of FIG. 24, the collection time interval for vehicle speed is set to 500 ms on 0, 0 (date), but the vehicle speed is collected in every 1000 ms (one second) on X,X (date).

In comparison with such collection time intervals, it is obvious that more detailed collection of the operating information can be realized on 0, 0 (date). However, if traffic congestion occurs, moving and stopping of the vehicle are repeated more frequently and vehicle speed changes more precisely. Therefore, it may be necessary to collect the information at a more detailed time interval. In addition, since vehicle speed is assumed to be changed to a smaller extent under the lower traffic condition, the collection time interval can be set longer. A longer collection time interval is effective for reduction in amount of information to be collected.

Since traffic congestion can be assumed by statistics, the information collection time interval is set short on the day where traffic congestion may be assumed or is set longer on the day where the traffic congestion is relatively small, to alleviate a load of the information collection processing and to reduce the amount of information to be recorded.

In the case of changing the collection time interval depending on a day as explained above, it is enough that the collection instructing data to be written on the IC card 241 carried by the driver is set to the predetermined value with the computer 240 before the vehicle leaves the office. Moreover, it is also possible that the collection instructing data to be recorded in the vehicle database is set previously for each day and the corresponding collection instructing data of that day is read from the vehicle database.

FIG. 24 also shows an example in which the vehicle speed is collected every 60 sec when the vehicle is traveling on the freeway, and every 1000 ms (one second) when the vehicle is traveling on an ordinary road.

When the vehicle is traveling on the expressway, since the vehicle speed is rather stabilized, any problem may not occur even when the vehicle speed collection time interval is set comparatively longer. On the other hand, when the vehicle is traveling on an ordinary road, the frequency of starting and stopping the vehicle becomes higher and a degree of change in the vehicle speed and moving distance becomes large. Therefore, the vehicle speed information must be collected at shorter time intervals when the vehicle is traveling on an ordinary road.

As explained above, it is recommended to change the collection interval of operating information depending on the place where the vehicle is traveling or the operating condition of the vehicle.

For instance, in the case of picking-up or distributing goods, since the vehicle operation schedule is previously determined, the route of the vehicle is also previously known. Therefore, the section of the expressway can also be known previously. Therefore, in the case of this embodiment, the position information (for example, exist and entrance of freeway) where the previously known collection instructing data is changed over is set in the collection instructing data. When the fact that the vehicle has passed the relevant position (or in the vicinity thereof) is determined using the GPS system, the collection instructing data is changed at that time. In the case of an example of FIG. 21, information can be collected under the collecting conditions corresponding to discriminated respective conditions of expressway and ordinary road by setting the position information such as toll gate of expressway to the latitude aa and longitude bb.

Here, it should be noted that the toll gate of expressway has the width of several meters to several tens of meters. Therefore, the vehicle does not pass through the point having the specified latitude and longitude. Moreover, even if it is assumed that the vehicle passes the specified point, it is difficult depending on the route of the vehicle to prevent an error from being generated in the passing position. Therefore, replacement of the collection instructing data can be done more accurately by giving a certain width to the latitude/longitude information given as the collection instructing data. When the vehicle has passed the range mentioned above, the vehicle has passed the particular point.

For example, for the toll gate of an expressway, the latitude/longitude of the center area of toll gate is set as the collection instructing data and the latitude/longitude of the point indicating the circle passing the position separated by 10 meters from the center of toll gate is also set. When the vehicle passes the range within this circle, the vehicle has passed the toll gate. In this case, the radius of the circle can be set freely. Moreover, the latitude/longitude information indicating the circle position is set to the value which does not complicate the position determining process in the mobile terminal. In addition, when the vehicle has passed the range inside the circle, the vehicle has passed the specified point in this embodiment according to the system.

When the vehicle has passed the area within the particular square or the point on a certain straight line, the vehicle has passed the specified point according to the system.

Changeover of the collection instructing data is not limited only to changeover for expressway and ordinary road. It is also possible to change over the collection instructing data for the road generating traffic congestion and the comparatively vacant road. The criterion for changeover of collection instructing data can be selected freely. Moreover, since the collection instructing data can be transmitted as required by radio communication to the mobile terminal from the office, the point for changing over the collection instructing data may be set to the mobile terminal based on the instruction from the office, based on the conditions of the vehicle.

Figure 25:
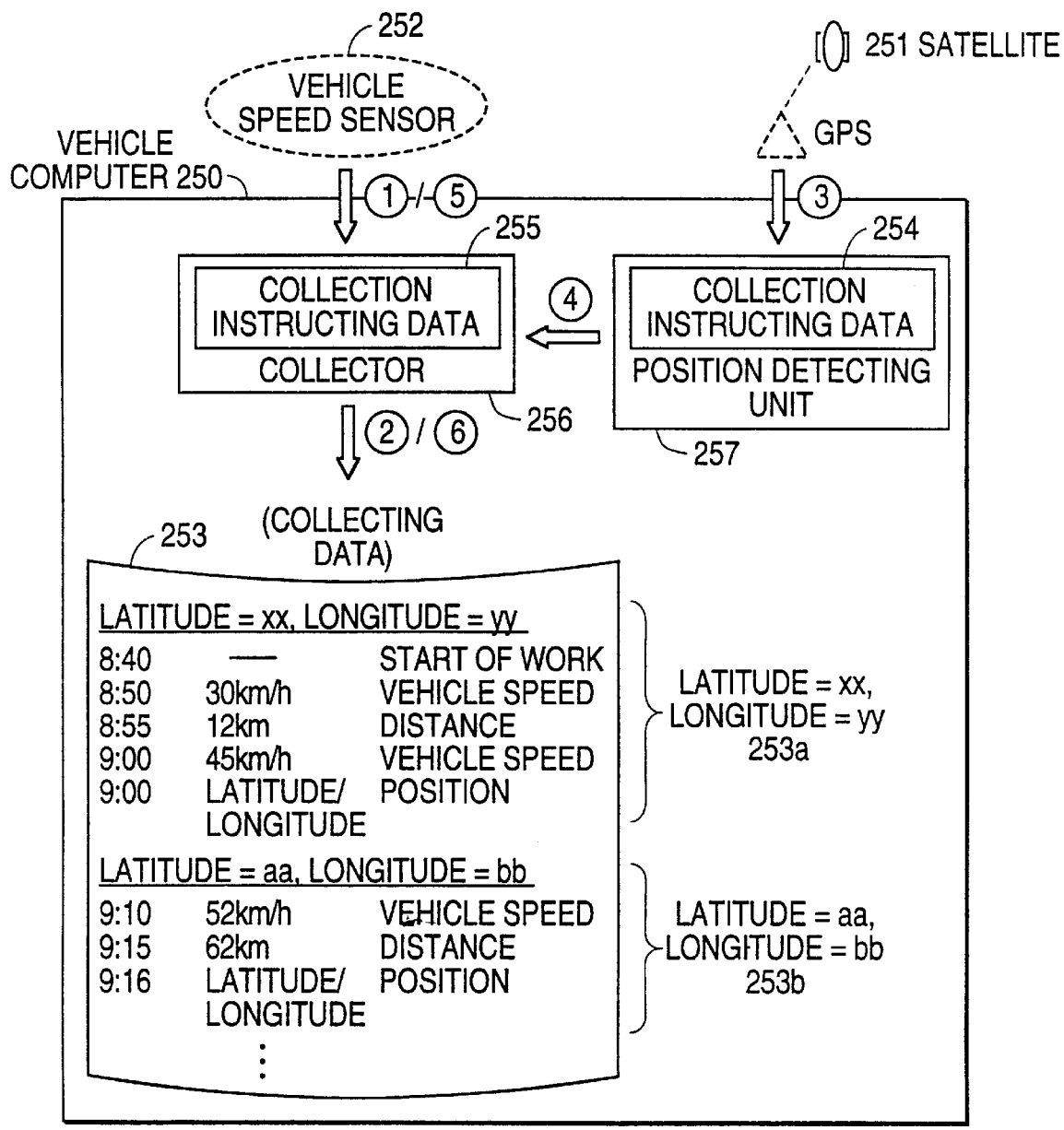
FIG. 25 is a diagram for explaining a collected data file of the mobile terminal when changeover is executed for information collection.

FIG. 25 is a diagram for explaining a collecting data file 253 of the mobile terminal 250 when information collection instructing data 255 is changed over and particularly indicates a format of the information stored in the collecting data file 253. As shown in FIG. 25, the mobile terminal (vehicle computer) 250 receives the signal from the satellite 251 and detects current position thereof with the position detecting unit 257 (3). Moreover, information such as vehicle speed and moving distance of vehicle is collected with the collector 256 based on the vehicle speed sensor 252 (1).

In the former half of the collecting data file 253, the vehicle speed, moving distance, vehicle position 253a obtained after the vehicle has left at 8:40 AM the point of latitude xx and longitude yy are recorded (2). In the case of the former half of FIG. 25, the vehicle speed is collected in every 10 minutes, while the moving distance in every 15 minutes and vehicle position in every 20 minutes.

Here, when the vehicle has passed the point of latitude aa and longitude bb just at 9:00 AM, the collection instructing data 254 of the format shown in FIG. 21 is changed over to the collection instructing data 255 to collect thereafter the vehicle speed in every 10 minutes, moving distance in every 20 minutes and vehicle position in every 16 minutes.

As explained above, the mobile terminal 250 collects the operating information based on the newly set collection instructing data 255 (5) to generate the collected work report information. As the data collected after 9:00 AM, the vehicle speed, moving distance, vehicle position 253b is recorded (6).

When the vehicle has returned to the office, a driver inserts the IC card to the office computer (not shown). The office computer accesses the work report file of the IC card to read the recorded collecting data. On the basis of the collecting data read out, the office computer respectively updates the work contents recorded in the driver database and vehicle database to reflect the work contents of that day. Moreover, in the case of radio type mobile terminal, the mobile terminal under operation can transmit the collecting data to the office computer each time when the collecting data is generated, or in every predetermined time or as required.

Figure 26:
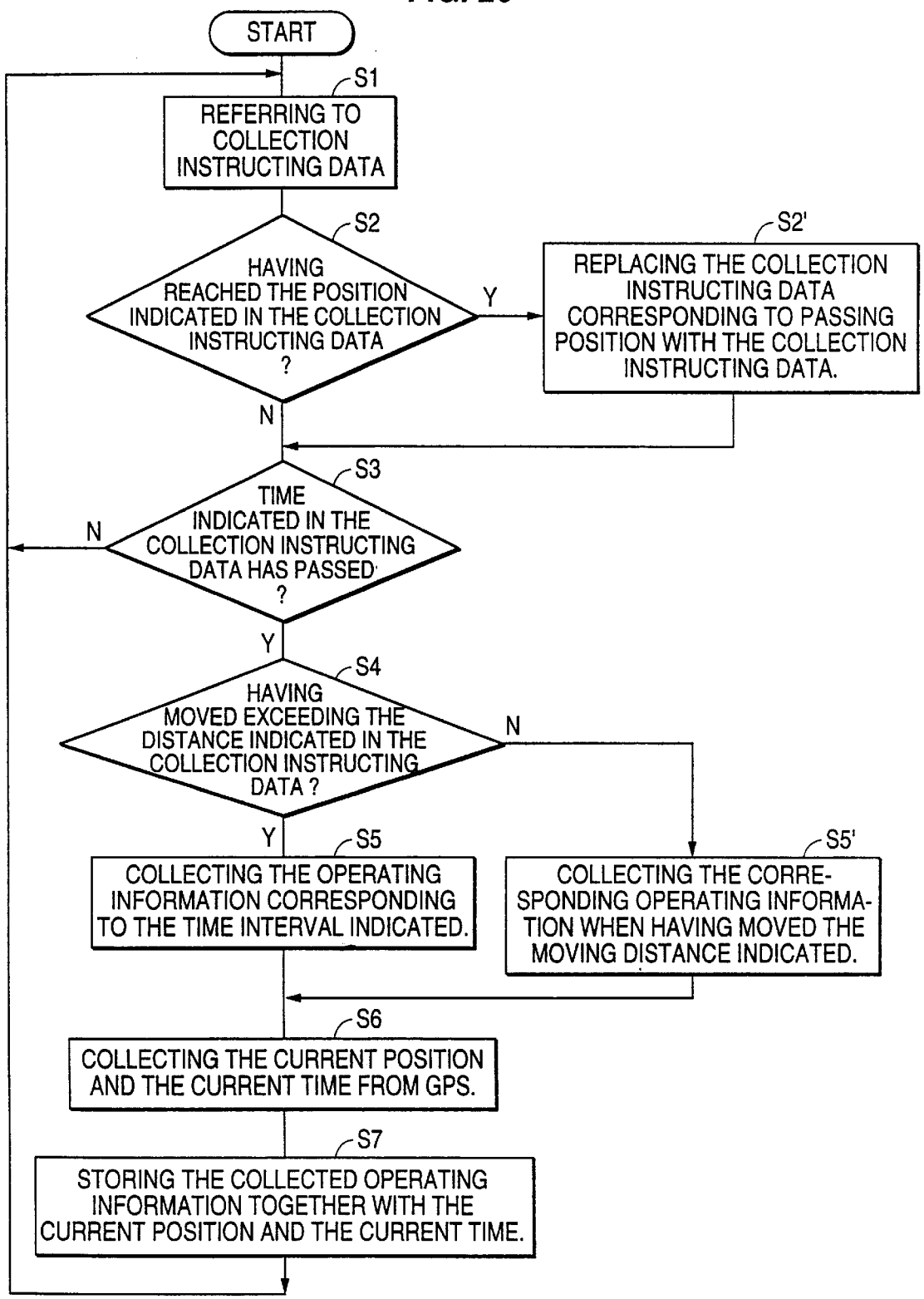
FIG. 26 is a flowchart illustrating the processing procedures of operation information collection based on the collection instructing data.

FIG. 26 is a flowchart for explaining the operating information collecting sequence based on the collection instructing data.

When the vehicle leaves the office, the mobile terminal refers to position information of the work report file (S1) and obtains the current position of vehicle using GPS to judge whether the vehicle has reached or passed the position indicated in the position information (S2). When several pieces of position information are set in the work report file, respective position information is collated with the current position of vehicle.

When the vehicle is judged to have reached the position indicated by the position information, the mobile terminal replaces the current collection instructing data with the collection instructing data stored in a pair of the position information as the new collection instructing data (S2').

In the step S2, when the vehicle is judged not to have reached the position indicated by the position information or after the collection instructing data is replaced in the step S2', the mobile terminal refers to the collection instructing data in the work report file to judge whether the time specified by the collection instructing data has passed or not from the preceding collection of information (S3). When collection of several pieces of information is instructed, passage of time from the preceding collection of information is discriminated for respective information items. In the step S3, when the specified time has not passed, processing returns to the step S1.

Meanwhile, when passage of the specified time is judged in the step S3, whether the vehicle has moved or not exceeding the distance instructed by the collection instructing data is judged (S4). When the vehicle is judged, in the step S4, to have moved exceeding the distance instructed, the operating information of the item corresponding to the time interval instructed by the collection instructing data is collected (S5). On the other hand, when the vehicle is judged not have moved the distance instructed in the step S4, operating information of the specified item is collected after the vehicle has moved the distance instructed by the collection instructing data (S5').

Subsequently, the current position of the vehicle when the information is collected and the current time are collected using GPS (S6). Thereafter, the collected operating information is stored in the memory area together with the current position of vehicle and current time collected in the step S6. With repetition of this processing, various pieces of operating information generated during operation of vehicle can be collected automatically.

Figure 27:
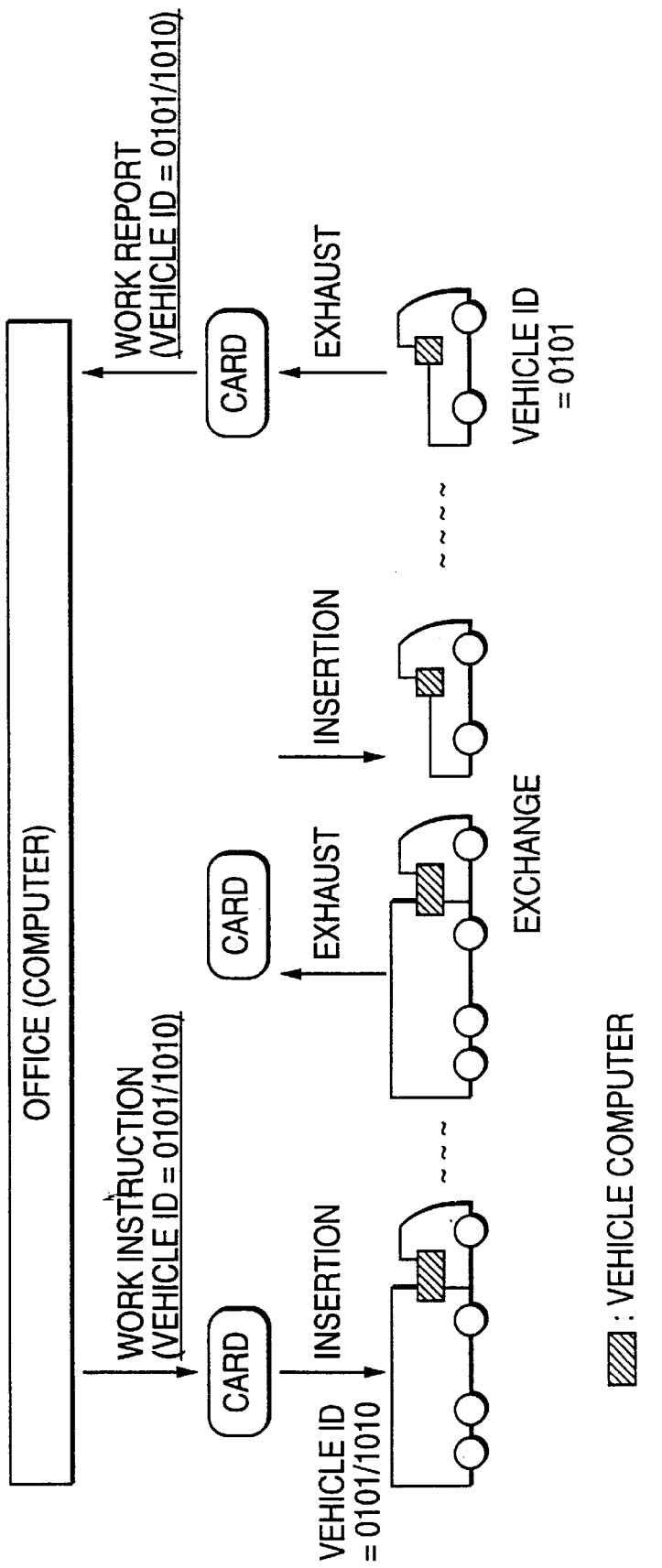
FIG. 27 is a diagram for explaining the operation of the present invention where a driver changes the vehicles during the duty time of a day.

FIG. 27 is a diagram for explaining the case where the driver changes the vehicle during the duty time within a day. In this case it is assumed that the vehicles having the vehicle ID numbers 1010 and 0101 are used. The work report file is set respectively for the vehicle ID numbers and the work report information of the vehicle having the ID number 1010 and that of the vehicle having the ID number 0101 are stored in the work report file of the IC card corresponding to the vehicle ID number.

When the vehicles have returned to the office, the computer reads the work report information corresponding to respective vehicle ID numbers from the IC cards when the drivers insert the IC cards into the computer and updates the work contents in the column corresponding to the respective ID numbers of vehicle database.

FIG. 28 is a diagram illustrating an example of criterion for judging the work contents in this invention. In this example, sensors are fitted at various sections of the vehicle. The mobile terminal recognizes conditions of various sections of vehicle depending on the signals outputted from these sensors and also judges what kind of work is being executed. A table of FIG. 28 stores information concerning the vehicle conditions depending on the on/off state of the sensor output. Moreover, in the column of remarks, the condition for discrimination or class of information to be further inputted are described. The horizontal line (–) in the table of FIG. 28 indicates that the on/off state of the sensor output is not used for judgement.

The key-on signal is used for judging whether the engine key of vehicle is loaded or not. For example, when the key on/off sensor turns on, the vehicle is ready to be started. Therefore, the vehicle is in the starting condition. When the key-on/off sensor turns off, the vehicle is in the ending condition and the vehicle engine is in the stopped condition. In this case, it is possible that returning a vehicle to the office is added as the condition for "ending of work".

In the case of this embodiment, since the engine start or stop is controlled on the basis of the IC card carried by the driver, the IC card becomes engine key. Therefore, it is also allowed to judge the key-on/off state depending on whether the IC card is inserted into the mobile terminal or not.

The engine rotation sensor ("Engine" in FIG. 28) judges rotation of the engine and the mobile terminal judges whether the engine is started or stopped depending on the signal from the engine rotation sensor. Moreover, since the vehicle speed sensor is fitted to the vehicle as explained above, the vehicle speed and moving distance can be obtained from the signal generated therefrom ("Vehicle speed/distance" in FIG. 28). When the engine rotation sensor turns on and the vehicle is judged to have moved for the predetermined distance based on the vehicle speed sensor, the mobile terminal determines that the vehicle has started to work based on the table of FIG. 28. Moreover, when the engine sensor is in the off state, the engine is stopped. However, only the engine is stopped and it is difficult to determine in what condition the vehicle stops.

For helping judgement for the reason of "Stopping condition of vehicle", sensors are respectively attached to the driver's doors, goods chamber doors and seat-belt. The sensors for detecting opening or closing conditions of doors are fitted to the driver's doors and goods chamber doors ("Driver's doors" and "Goods chamber doors" in FIG. 28. When the driver is getting on or off the vehicle, the driver's door is opened or closed. Moreover, for loading or unloading goods, the goods chamber door is opened or closed. In addition, the seat-belt sensor is fitted to the seat-belt for detecting the fastening condition of the seat belt ("Seat belt" in FIG. 28). When the driver leaves the vehicle, the seat belt sensor is turned off and when the driver is sitting on the driver's seat with the seat belt fastened, the seat belt sensor is in the on state.

When only the engine rotation sensor is in the off state, the mobile terminal judges the vehicle is in the "Stop" condition. In this case, output condition of the driver's door sensor is not considered. When the driver's door sensor is turned off (driver's door is opened) and the seat belt sensor is also turned off under the condition that the engine rotation sensor is in the off state, the mobile terminal judges that the vehicle has reached any position. Moreover, the mobile terminal outputs, under this condition, a message urging the driver to input work contents. When the work contents are inputted, the mobile terminal judges that the work inputted has been executed. Here, as the work contents in FIG. 28, for example, "Rest", "Check", "Fueling" may be listed.

When the engine rotation sensor is turned off and the goods chamber door sensor is also turned off (goods chamber door is opened), the mobile terminal judges that the goods are either loaded or unloaded. In this case, since it is also probable that the other crew is actually loading or unloading goods in place of the driver, outputs of the driver's door sensor and seat belt sensor are not used for judging of "loading and unloading of goods". These outputs may naturally be used for judgement of "loading and unloading of goods".

The mobile terminal totally judges the work being carried out based on the output signals from these sensors. A method of judging the work contents will then be explained hereunder.

Figure 29:
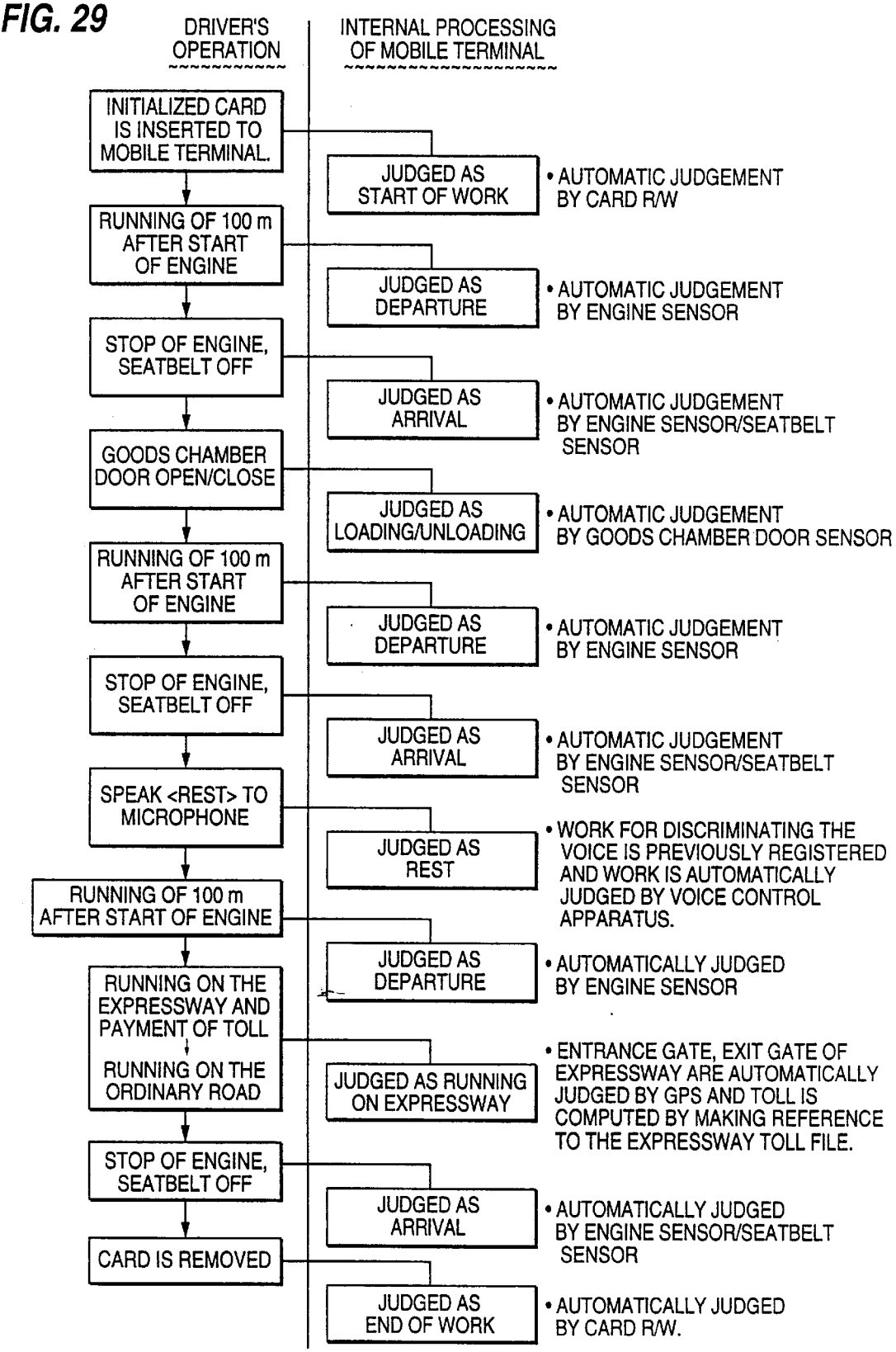
FIG. 29 is a diagram for explaining judgment for work contents from "beginning of work" to "ending of work" and method of recording the work performed.

FIG. 29 is a diagram for explaining discriminating work contents from "Beginning off-work" to "Ending of work" and a method of recording work contents (work performed). When the initialized IC card is inserted into the mobile terminal, the mobile terminal judges that the vehicle is in the condition, "Beginning of work" and records the "Beginning of work" together with the time of judgment as work report information.

The mobile terminal judges whether the engine is started or not depending on the engine sensor and also judges the vehicle is in the "Departure" condition, upon judgement depending on the vehicle speed sensor that the vehicle has run the predetermined distance, for example, 100 m. In this case, the mobile terminal recognizes the current latitude and longitude of the vehicle using GPS and records the information indicating "Departure" together with the collected latitude/longitude and current time as the work report information.

When engine stop is detected by the engine sensor, the mobile terminal judges the vehicle is in the "Stop" condition. When the fact that the seat belt is unfastened is detected by the seat belt sensor, and the fact that the driver's door is opened is detected by the sensor fitted to the door, the mobile terminal judges the vehicle has "arrived" at any position. In this case, the mobile terminal must judge that the vehicle has reached the target position or the driver has stopped the vehicle to take a rest. Stop of vehicle because it has arrived at the target position can be judged by previously setting the latitude and longitude information of the target position into the mobile terminal because the position information can be collected with GPS. However, it is also probable that the driver takes a rest while the vehicle is stopped at the same place after arriving at the target position and performing the work. In such a case, collection of the position information by GPS is insufficient and it is also necessary to detect the times for ending the work and starting the rest.

Therefore, in the case of this embodiment, the work contents are discriminated as explained hereunder. When the fact that the goods chamber door is opened for the period longer than the predetermined time, for example, one minutes or longer by the goods chamber door sensor, the mobile terminal judges the goods chamber door has been opened for the "loading or unloading of goods". In this case, the mobile terminal obtains the current latitude/longitude of the vehicle with GPS and records the information indicating the "loading or unloading of goods" as the work report information together with the current time and latitude/longitude information.

Moreover, the mobile terminal urges the driver to input, when the vehicle has stopped, the reason why the vehicle has stopped to the mobile terminal by audible voice or display. For example, when the driver wants to take a rest, the driver inputs the information to take a rest. For the input of information, for example, the keypad may be used or the reason for stopping the vehicle may be inputted with an audible voice input.

As explained previously, a microphone to accept voice input is also provided in the mobile terminal. Moreover, it is preferable that the information indicating the reason for stopping the vehicle is registered, as the voice information, to the mobile terminal or the IC card carried by the IC card. When the vehicle has stopped, the driver inputs the reason of stoppage with the voice input through the microphone. For example, when the drive wants to take a rest, he issues the word "Rest".

The mobile terminal collates the information of voice input by the driver with the voice information previously registered to judge the reason of stoppage inputted by the driver based on the collation and then records the reason for stoppage together with the latitude/longitude information collected by GPS as the work report information.

The reasons for stoppage of vehicle, checking of vehicle, fueling, washing of vehicle and others may be considered and the reason for stoppage of vehicle can be confirmed later by inputting such reasons by voice input or from the keypad. In the case of inputting the reason using the keypad, a plurality of display screens and corresponding keys are provided as shown in FIG. 11. Therefore, the mobile terminal displays on the screen the items such as "Rest", "Check" and "Fueling", etc. The driver operates the key corresponding to the display of the item to be inputted by referring to the item displayed on the screen. Thereby, the reason for stoppage of vehicle may be inputted to the mobile terminal in place of the voice input.

Meanwhile, when the vehicle travels on the toll road such as an expressway, it is requested to record the toll or the section traveled. For this purpose, the latitude/longitude information of the tolls of expressway are previously recorded to the mobile terminal. Moreover, it is also possible to record, as required, the road names and toll gate names. Whether the vehicle has passed the toll gate of expressway can be determined depending on the result of detection of the vehicle position by GPS.

As explained above, when the vehicle has passed the entrance gate of the expressway, the name of this entrance gate is recorded together with the current time as a part of the work report information.

Moreover, the mobile terminal is also provided with an expressway toll file in which tolls between gates of expressway are recorded. The mobile terminal computes the tolls of expressway and records as the work report information by referencing the expressway toll file based on the entrance and exit gates of expressway through which the vehicle has passed. For the section through which the vehicle passes for the first time, the toll may not be recorded, in some cases, in the expressway toll file. In this case, it is impossible for the mobile terminal to compute the toll even by retrieving the expressway toll file.

Therefore, the mobile terminal requests, with voice input or display, the driver to manually input the toll of expressway. The toll inputted by the driver responding to such request is stored together with the running section of expressway into the work report instructing file. Simultaneously, on the basis of the entrance and exit gates through which the vehicle has passed and the toll inputted, the mobile terminal updates the expressway toll file by adding next toll thereto as the preparation for the subsequent traveling on the expressway. The result is also sent to the office computer together with the work report information. Therefore, this result can also be reflected on the expressway toll file for the other mobile terminals.

Here, for the operations of vehicles, it is requested that drivers observe the speed limit. Therefore, when it is found that the detected vehicle speed is exceeding the limit speed, an alarm is issued to the driver. However, the speed limit is different depending on the class of roads (expressway, ordinary road, etc.) and the speed limit is often different depending on the places on the same road.

Figure 30:
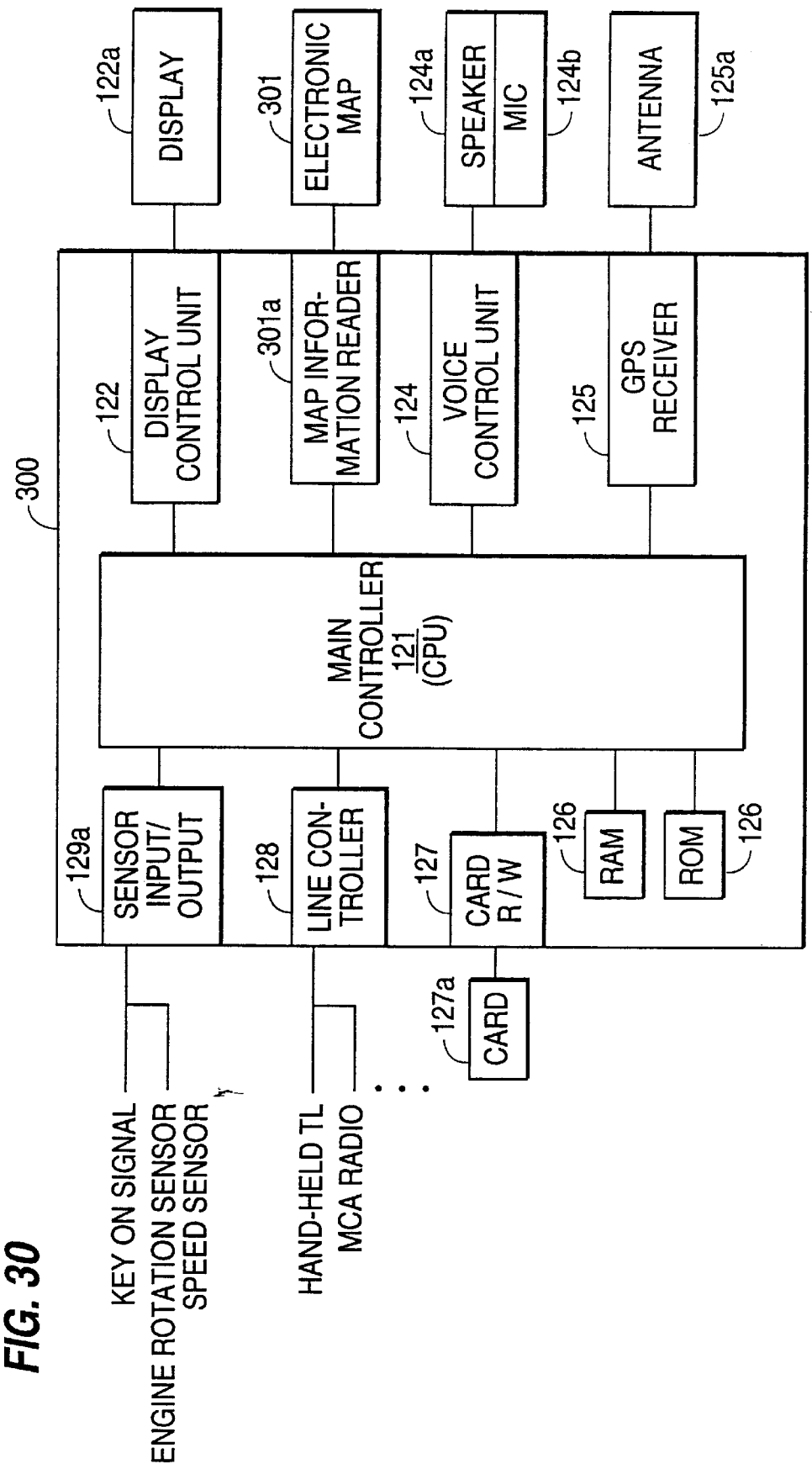
FIG. 30 is a diagram illustrating an example of a mobile terminal storing map information.

FIG. 30 is a diagram illustrating an embodiment of the mobile terminal for overcoming such a situation. The mobile terminal is similar to the mobile terminal shown in FIG. 12 and the explanation of the elements of the mobile terminal shown in FIG. 30 is omitted here.

In the mobile terminal 300 of FIG. 30, an electronic map 301 storing electronically map information is connected to the map information reader 301a. The electronic map information is recorded, for example, in a CD-ROM, IC card, etc. Moreover, a map information reader 301a for reading the map information stored in the electronic map memory is connected to the main controller 121. As the map information reader 301a, for example, a CD-ROM player or IC card reader, etc. may be used. These can be selected depending on the medium on which the map information is stored.

Here, the speed limit is often different depending on the class of road and place of road. Therefore, the speed limits in the respective roads are recorded together with the map information in the mobile terminal of FIG. 30. Moreover, as the additional information, the position information of exit gates of expressway and position information of target positions for the picking up or delivery of goods are also recorded in the map information.

Moreover, as is already explained above, the mobile terminal collects, during the operation of the vehicle, the vehicle speed and position in the predetermined time interval. Accordingly, the mobile terminal of FIG. 30 judges whether the vehicle is running at the speed lower than the speed limit by utilizing these pieces of information.

Figure 31:
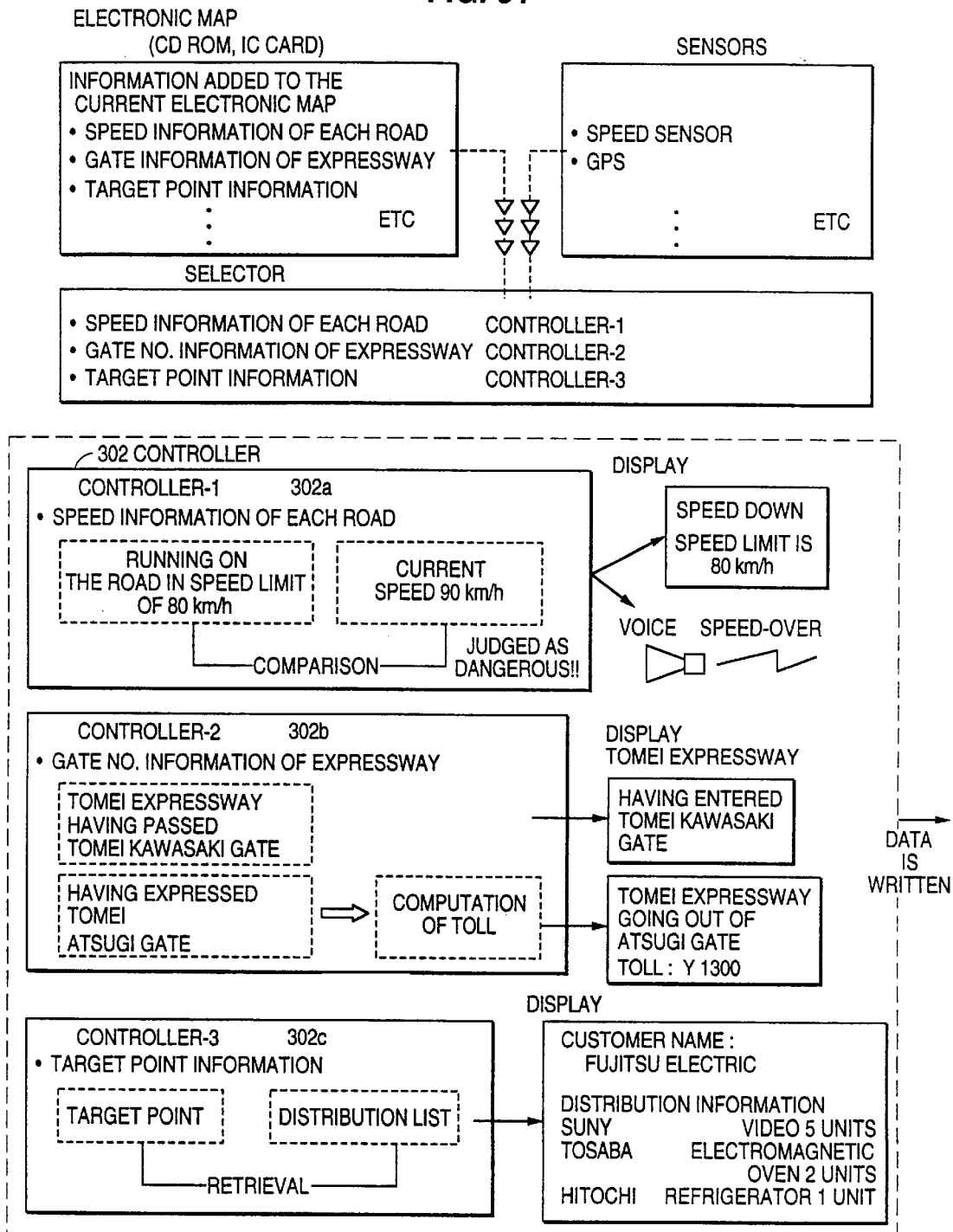
FIG. 31 is a diagram illustrating the control of the mobile terminal shown in FIG. 30.
Figures 34A, 34B:
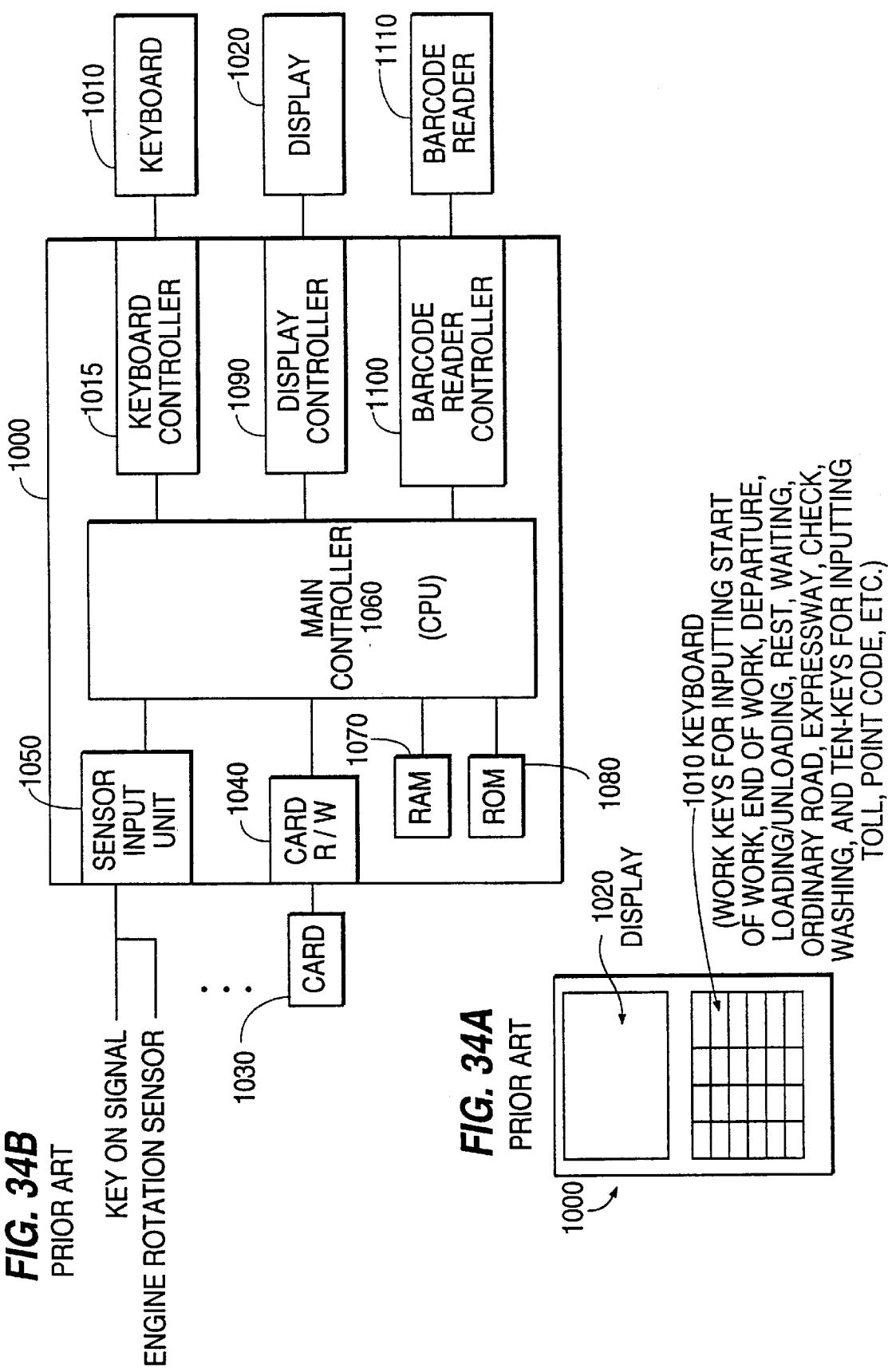
FIGS. 34A and 34B are diagrams illustrating an existing mobile terminal.

As shown in FIG. 31, the controller 302 is roughly classified into a controller 1 (302a), controller 2 (302b) and controller 3 (302c). Correspondence between the speed limit and vehicle speed is executed in the controller 1. Each time when the sensors output the vehicle speed and vehicle position, the speed limit information of each road, gate information of expressway and target position information are read from the map information. The information corresponding to the nearest position is preferably read depending on the current position of vehicle. Each piece of information read from the map information is selected by a selector and thereby the necessary information is sent to each controller.

The information necessary for determining the speed limit is sent to the controller 1. As this information, at least the information concerning the current speed of the vehicle and speed information (speed limit) of each road are necessary. The controller 1 receives the speed limit information read from the electronic map based on the current position of vehicle and compares the speed limit of the road on which the vehicle is traveling with the current vehicle speed.

In the case of FIG. 31, it can be recognized that the speed limit of the road on which the vehicle is running is 80 km/h. With an output of the vehicle speed sensor, it is recognized that the vehicle is traveling at the speed of 90 km/h. As a result of a comparison between the speed limit and running speed, the controller 1 judges that it is dangerous because the vehicle is traveling at the speed exceeding t he speed limit.

Therefore, as shown in FIG. 31, the controller 1 displays a message urging the driver to control the vehicle speed and simultaneously issues a voice message, "You are exceeding the speed limit", for example, from the speaker. It is preferable to issue a voice message to urge the driver to control the speed because the driver is not required to move his eyes to the display. This message is continuously issued until the vehicle speed becomes lower than the speed limit. It is now possible to urge the driver to take care not to drive the vehicle at the speed exceeding the speed limit, realizing the more detailed safety management.

The information to judge whether the vehicle has passed the gate of the expressway is sent to the controller 2. At least the current position of vehicle and gate information of the expressway are necessary to make this determination. The controller 2 judges whether the vehicle has passed the gate of the expressway on the basis of the cur rent position of vehicle obtained by GPS and the gate information of expressway read from the electronic map.

When the vehicle is judged to have passed the gate of the expressway, the controller 2 records the name of that gate. In the case of FIG. 31, the fact that the vehicle has passed the "TOMEI-KAWASAKI" gate and "TOMEI-ATSUGI" gate of the TOMEI expressway is recorded in the controller 2. When the vehicle enters the TOMEI expressway from the "TOMEI-KAWASAKI" gate, the controller 2 stores this fact and displays a message of "Having entered TOMEI-KAWASAKI of TOMEI expressway" on the display screen. When the vehicle has passed the "TOMEI-ATSUGI" gate, the controller 2 recognizes that the vehicle has got out of the expressway from the "TOMEI-ATSUGI" gate and displays a message of "Having got out of TOMEI expressway from ATSUGI gate" on the display screen.

Simultaneously, the controller 2 computes the toll o f the expressway from the information about the two gates, which the vehicle h as passed. The toll can be computed by referencing the table in which the tolls between gates are respectively recorded as explained previously. The controller 2 displays the toll as "Toll =V 130011 on the display screen and writes the data including the name of gate to enter the expressway, the name of gate to got out of the expressway a nd toll in the memory area.

Thereby, the driver is now freed from the work to manually input the information concerning the name of gate having passed and toll into the mobile terminal, which eliminates input error. Moreover, since the mobile terminal computes and records the toll, a dishonest request by the driver for toll of expressway, which the vehicle does not travel can be prevented.

The controller 3 executes the processing based on the target position information. The controller 3 retrieves, depending on the vehicle position obtained by GPS, a distribution list recording the target point nearest the current position of vehicle and goods to be distributed thereto from the electronic map information. The controller 31 displays such a result on the display screen to display the name of customer as the target point, name of goods and number of goods to be distributed to the driver.

Thereby, when the vehicle has reached the target point, the driver is freed from input of the name of target point to the mobile terminal and it becomes possible to notify the driver t hat the vehicle is coming close to the next target point. Moreover, since the information concerning goods is previously recorded in the mobile terminal, when the vehicle is coming close to the target point, the mobile terminal can automatically display both target point and goods to be distributed in combination, eliminating such distribution error that the goods are erroneously distributed.

When the IC card is removed from the mobile terminal after the engine is stopped, the mobile terminal detects the fact from a sensor output and when the vehicle has returned to the office, the mobile terminal judges the vehicle is in the "Ending of work" condition using GPS.

In the IC card exhausted from the mobile terminal after the "Ending of work" condition, the work report information collected from the mobile terminal during the traveling of the vehicle is stored. This information is sent to the office computer for renewal of contents of the vehicle database and driver database depending on the information transmitted.

Here, it is also preferable that the respective work report information is temporarily stored, during the running of the vehicle, within the mobile terminal. When the driver inserts again the IC card into the mobile terminal for the engine stop processing, the work report information stored in the mobile terminal is down-loaded to the IC card.

FIG. 32A and FIG. 32B are diagrams illustrating an example of the work daily report generated for each driver and vehicle. In this figure, FIG. 32A is a personal daily report, while FIG. 32B is a vehicle daily report. In this embodiment, since the driver database and vehicle database are prepared in the office computer, the personal and vehicle daily reports storing the personal work contents and vehicle operating condition can be outputted very easily.

In the case of personal daily report, the time schedule of each driver who has driven the vehicle is outputted for each vehicle. In an example of FIG. 32A, the driver "Hoshino" has driven the large size vehicle having the ID number "1010" from 9:00 to 11:00. Moreover, the same driver has driven the small size vehicle having the ID number "010111 from 12:00 to 14:00 and again the large size vehicle having the ID number 11101011 from 15:00 to 17:00. The driving conditions of each driver can be confirmed by outputting such personal daily report for each driver.

As explained above, since the personal daily report outputs the vehicle, which the driver has driven and the time schedule of driving, the personal working condition can be detected easily. As is also explained above, since the personal daily report outputs the data depending on the information recorded in the driver database, the personal daily report can easily provide an output. On the other hand, the vehicle daily report outputs the time schedule of vehicle together with the name of driver having driven the same vehicle.

FIG. 32B shows an example of output of the vehicle daily report concerning the large size vehicle having ID number 1010. This vehicle has been driven by the driver "Hoshino" having the driver ID number "000001" from 9:00 to 11:00. Thereafter, it has been driven by the driver "Sato" having the driver ID number "000002" from 11:00 to 13:00; by the driver "Yoshinaga" having the driver ID number "1000003" from 13:00 to 15:00; and finally driven again by the driver "Hoshino" from 15:00 to 17:00.

The operating condition of each vehicle can be detected easily by outputting such a daily report of each vehicle. On the occasion of outputting such a daily report for each driver and vehicle, the driver ID number or vehicle ID number for outputting the daily report is inputted to the office computer. Responding to such input, the computer retrieves the driver database and vehicle database to edit the required work report information in the form of the daily report and then provide the printed output thereof.

In this example, the daily report having edited the works of a day has been explained but it is of course possible to output the work contents during a month, year or desired period. Moreover, the items to b e outputted in th e daily report are not limited to the example of FIG. 31 and the necessary items can be outputted.

FIG. 33 is a diagram illustrating an application example of the vehicle operation management system explained above for picking up or distribution of goods.

The term "Field office" (hereinafter referred to as office) corresponds to the office in above explanation. The arriving and leaving information is fetched by the office computer when a driver operates employee card (IC card) when a driver arrives at or leaves the office. A database for storing the working data is provided in the office. The arriving and leaving information fetched by the employee card is stored in this database.

Moreover, the computer generates an arriving/leaving management table on the basis of the information stored in the working database, enabling the reference to know, as required, the working condition of each driver. In addition, inquiry for the arriving/leaving condition from each driver can be accepted by referencing the working database.

The "operation management system" (hereinafter referred to as management system) corresponds to the "office computer" explained above and is used for vehicle operation management. The management system is connected with a plurality of terminals by LAN. In addition, the office is provided with the vehicle database.

When the vehicle is leaving the office, driving of vehicle by the driver is started by generating an operation card recording the work instructing information (corresponding to the IC card to be carried by the driver explained above) and inserting the operation card into the mobile terminal by the driver.

After the driving is started, messages of fixed format indicating occurrence of irregular event, which is generated, for example, when the vehicle is traveling on the road other than the predetermined route or when the vehicle is traveling dangerously at a speed exceeding the speed limit, messages issued under the normal condition and times when the vehicle leaves a customer shop for the picking up or distribution of goods are exchanged between the office and vehicle.

Here, the work instructing information includes the vehicle operation route. Therefore, the mobile terminal confirms the current route of the vehicle and predetermined route by receiving GPS information and issues an alarm, when the vehicle is traveling the road other than the predetermined route, to the driver or notifies, to the office, a message indicating that the vehicle is traveling the route other than the predetermined route.

Moreover, the work instructing information also includes a work scheduling diagram recording the time schedule of works. Therefore, the mobile terminal checks the time when the vehicle has actually arrived at a customer shop and also collates the arriving time with the scheduled arriving time recorded on the work scheduling diagram to confirm whether the vehicle is operated as specified in the scheduling diagram or not. If an irregular event occurs, for example, when the arriving time is different to a large extent from the scheduled arriving time, the mobile terminal notifies the difference to the office.

A customer shop is also capable of installing an apparatus for communicating with the mobile terminal. It is now possible to inform the customer that vehicle is approaching customer's shop by issuing a signal from the mobile terminal when the vehicle is coming close to the customer shop. In addition, if the arrival at the customer shop of the vehicle is delayed from the scheduled time or preceded due to traffic condition and situation of goods distribution, the probability of change of arrival time can be transmitted to the customer by sending a message suggesting such change of arrival time to a customer apparatus from the mobile terminal.

When the vehicle has returned to the office completing the driving, the driver inserts the operation card into the operation management system installed in the office. Thereby, the information including the work contents of that day can be collected and provided to the operation management system from the card. The collected information is stored in the vehicle database (or in the driver database).

Moreover, the office is further provided with a "vehicle movement management system" for movement management of each vehicle. communication is carried out by radio between the office and vehicles and the current position of vehicle can easily be detected in the office side by sequentially sending the information indicating the current position of vehicle to the office from the mobile terminal.

The office is further provided with a map database storing the map information of respective areas. The movement management system displays superimposed position information received from each vehicle and map information stored in the map database. With such a superimposed display, the current position of vehicle can be detected easily even in the office.

As the map information to be displayed on the display screen, the optical one for display of vehicle position must be selected depending on the current position of vehicle received (latitude/longitude). In addition, the movement of each vehicle can be surveyed by, storing the movement of each vehicle into the database (for example, vehicle database) for storing operation achievement, etc.

The subsequent survey of movement of each vehicle is very useful for vehicle operation management because the travel route of the vehicle can be reviewed and an effective distribution route can be determined.

Moreover, since a message can be sent to the vehicle from the office by radio communication, if an emergency occurs, an instruction for operation management can be transmitted to the specified vehicle. In this case, in order to specify the vehicle, a method, for example, the ID number of the vehicle to be specified is added to the message and the mobile terminal confirms the vehicle ID number transmitted, can be employed.

Furthermore, the traffic condition of road can also be detected depending on the movement of each vehicle. Therefore, it is also possible, as required, that the change of operation route and distribution sequence can be transmitted to each vehicle from the office.

What is claimed is:

1. A mobile terminal for a moving body, comprising:
    a memory storing a first identification number identifying an individual utilizing the moving body and a second identification number identifying the moving body;
    a collator collating an externally inputted user identification number and moving body identification number with the identification numbers stored in said memory; and
    a control unit starting and stopping said moving body when the collator determines that the first and the second identification numbers stored in the memory are the same as the externally inputted user and moving body identification numbers, respectively.

2. A mobile terminal for a moving body, comprising:
    a first memory storing an identification number identifying the mobile terminal;
    a second memory storing an externally inputted vehicle identification number and a driver identification number, inputted when the engine of the moving body is started;
    a collator collating the driver identification number inputted by the driver with the driver identification number stored in said second memory; and
    a control unit controlling the moving body to stop the engine of the moving body if the collator determines that the driver identification number stored in the second memory is the same as the driver identification number inputted by the driver when the driver stops the moving body from moving.

3. A mobile terminal for a moving body, comprising:
    a transfer unit receiving work instructing information, including information related to a destination, which is externally transferred to instruct an individual utilizing the moving body about the work to be executed;
    a control unit extracting the work instructing information from the transfer unit in which the mobile terminal is located;

a memory storing the work instructing information extracted by said control unit; and a display unit displaying the work instruction stored in the memory and thereby instructing the individual to perform the work specified by the work instruction information.

4. The mobile terminal as set forth in claim 3, wherein:

said work instructing information includes a moving body identification, and the mobile terminal compares a received identification and an identification stored in said memory, and stores received work instructing information to said memory when the identification match.

5. A mobile terminal for a moving body, comprising:

at least one sensor, mounted in the moving body, for outputting signals indicative of the conditions of the moving body;

a first memory storing a table, the table including relationships between work to be performed by an individual utilizing the moving body and output signals from the sensor;

a discriminating unit determining the work the individual made that are stored in the table in said memory; and a position detecting unit detecting a current position of a moving body;

wherein the information concerning the work determined by said discriminating unit is stored in a second memory together with the information concerning the current position of the moving body detected by said position detecting unit.

6. The mobile terminal as set forth in claim 5, further comprising a second memory for storing the information concerning conditions of a moving body determined by said discriminating unit.

7. The mobile terminal as set forth in claim 6, further comprising:

a position detecting unit detecting a current position of a moving body, wherein the information concerning conditions of the moving body determined by said discriminating unit is stored in said second memory together with the information concerning the current position of the moving body detected by said position detecting unit.

8. The mobile terminal as set forth in claim 5, further comprising a transfer unit transferring, to a device external to the mobile terminal, the information concerning conditions of the moving body determined by said discriminating unit.

9. A mobile terminal for a moving body comprising:

at least one sensor, mounted in the moving body, outputting signals indicative of the conditions of the moving body;

a memory storing a table, the table including a relationship between an output signal from the sensor and corresponding conditions of the moving body and/or work to be performed by an individual utilizing the moving body;

a discriminating unit determining conditions of the moving body based on contents stored in said memory by referencing the table in said memory; and an output unit outputting, when said discrimination unit judges that the condition of the moving body cannot be determined uniquely depending on said output signals, a message urging a driver of the moving body to input into the mobile terminal the condition of the moving body at that time and/or contents of work to be performed using the moving body.

10. A mobile terminal for a moving body, comprising:

a collector collecting moving body operating information including moving body speed and moving distance of the moving body;

a memory storing a time interval for collecting said moving body operating information by said collector; and a discriminating unit discriminating the current position of the moving body, wherein said memory stores, in a pair, the time interval information for collecting said collecting information and the information concerning a position interval for collecting said collection information, and wherein said collector collects, when said discriminating unit determines the moving body has reached the position corresponding to the position information stored in said memory, and/or the time interval for collecting said collection information has expired.

11. A mobile terminal for a moving body, comprising:

a first memory storing information concerning entrance or exit of an expressway;

a discriminating unit determining a current position of the moving body; and a second memory storing the entrances or exits of the expressway determined by said discriminating unit.

12. The mobile terminal according to claim 11, wherein the first memory stores information concerning tolls between entrances and exits of an expressway;

the discriminating unit determines the toll of the section of expressway traveled by the moving body by referencing said first memory; and the second memory stores the toll information determined by the discriminating unit with entrance/exit information where the moving body passed.

13. A mobile terminal for a moving body comprising:

a position detecting unit detecting a current position of the moving body;

a memory storing speed limits of routes together with position information in which said moving conditions are previously established;

a sensor detecting moving speed of the moving body;

a collator reading a speed limit corresponding to the current position of the moving body determined by said position detecting unit from said memory and collating the speed limit read from said memory with the current speed of the moving body detected by said sensor; and a control unit outputting a message to an individual in the moving body when the current speed of the moving body is found, as a result of collation by said collating means, not to correspond to the speed limit at the current position.

14. A moving body operation management system for controlling information relating to the operation of at least one vehicle, comprising:

a vehicle information database storing a vehicle class of each vehicle;

a driver information database storing a driving license class of each driver of a vehicle; and a unit collating the vehicle class of each vehicle and the driving license class of each driver to generate work instruction information to control the at least one vehicle.

15. The moving body operation management system set forth in claim 14, wherein said driving license class database stores driving qualification information of each driver.

16. The moving body operation management system set forth in claim 15, wherein the moving body driving qualification information of each driver includes the class of driving license carried by each driver.

17. A moving body operation management system having a host unit and at least one mobile terminal mounted on a moving body, wherein:
said host unit comprises:
a work instruction generating unit generating work instruction information of work to be performed, and
a first transfer unit transferring the work instruction information to each said mobile terminal, and
each said mobile terminal comprises:
a second transfer unit receiving the work instruction information transferred from said first transfer unit,
a controller generating work report information when the work to be performed is done,
a memory storing the work instruction information and the work report information, and
a display displaying the work instruction information and thereby instructing the individual to perform the work specified by the work instruction information.

18. The moving body operation management system as set forth in claim 17, wherein:
said second transfer unit transfers work report information to said host unit from said mobile terminal; and
said first transfer unit receives work report information transferred from said second transfer unit.

19. The moving body operation management system as set forth in claim 17, wherein said first and second transfer units are used to transmit and receive work instructing information and work reported information by radio.

20. The moving body operation management system as set forth in claim 17, wherein said first and second transfer units comprise reading/writing units reading information from a portable memory unit or writing information to the portable memory unit, the work instruction information and work report information being transferred between said host unit and said mobile terminal through said portable memory unit.

21. A moving body operation management system having a host unit and at least one mobile terminal mounted on a moving body of a plurality of moving bodies for management of information relating to operations of the moving bodies, wherein said host unit comprises:
a moving body information database storing information identifying a class of each moving body of the plurality of moving bodies and corresponding operating information concerning operations of each moving body;
a driver information database storing an identification number of each driver and information concerning a driving license class of each driver providing authorization to drive a respective class of moving bodies;
an input unit into which at least the identification number of the driver is input; and
a discriminating unit collating, based on each identification number input into said input unit, information concerning the corresponding driver, as read from the driver information database, with a class of the moving bodies, read from the moving body information database, and determining the authorization of the corresponding driver to drive a moving body of the class.

22. The moving body operation management system as set forth in claim 21, wherein said host unit further comprises an output unit outputting, when said discriminating unit determines the qualification of the driver, the work instructing information to inform the driver of the work to be performed utilizing the moving body.

23. A moving body, comprising:
at least one sensor mounted to respective areas to output signals corresponding to conditions of mounting areas;
a terminal providing an input unit to which sensor outputs are inputted;
a position detecting unit detecting a current position of the moving body;
a first memory storing information concerning conditions of the moving body depending on sensor outputs;
a discriminating unit determining the current conditions of the moving body by referencing said first memory depending on said sensor outputs; and
a second memory storing the current conditions of the moving body with information concerning the position of the moving body where the current condition of the moving body is determined.

24. A moving body, comprising:
an engine;
a control unit controlling at least start and stop conditions of said engine; and
a memory storing the identification number given to the moving body in advance;
wherein said control unit collates the identification number stored in said memory with the identification number inputted from said input unit, and controls the engine to start and stop when both identification numbers are equal.

25. A moving body as set forth in claim 24, where in
said input unit receive s input of the identification number of the driver who drives the moving body for starting or stopping said engine and said control unit collates the driver identification number inputted for starting the engine with the driver identification number inputted for stopping the engine and controls the engine to stop when both identification numbers are equal.

26. A method for managing at least one moving body having a mobile terminal including a memory, comprising:
storing an identification number identifying the mobile terminal in the memory;
collating an externally inputted identification number with the identification number stored in the memory; and
starting or stopping said moving body when the identification number stored in the memory is the same as the externally inputted identification number.

27. A method for managing a moving body having a mobile terminal mounted on the moving body and including a memory, comprising:
transmitting work instruction information from a host unit to the mobile terminal, the work instructing information indicating work to be performed by an individual utilizing the moving body;
storing the work instruction information in the memory;
sensing operating conditions of the moving body using sensors and storing the operating conditions in the memory; and
transmitting the operating conditions from the mobile terminal to the host unit, such that the host unit detects, from the transmitted operating conditions, the work performed by the individual.

28. A mobile terminal for a moving body, comprising:

a memory storing an identification number identifying an individual utilizing the moving body;

a collator collating an externally inputted user identification number with the identification number stored in said memory; and a control unit starting and stopping said moving body when the collator determines that the identification number stored in the memory is the same as the externally inputted user identification number.

29. A mobile terminal for a moving body, comprising:

a memory storing an externally inputted driver identification number, inputted when the engine of the moving body is started;

a collator collating the driver identification number inputted by the driver with the driver identification number stored in said memory; and a control unit controlling the moving body to stop the engine of the moving body if the collator determines that the driver identification number stored in the memory is the same as the driver identification number inputted by the driver when the driver stops the moving body from moving.

30. The mobile terminal for a moving body, comprising:

a memory storing time interval information;

a collector collecting moving body operating information including moving body speed and moving distance of the moving body by the time interval information stored in the memory;

a position detecting unit detecting a current position of the moving body; and a collator, wherein the memory stores a plurality of sets of the time interval information and position information;

the collator collates the current position of the moving body with the position information stored in the memory, and extracts the time interval information which is paired with position information when it is determined that the moving body currently exists; and the collector collects the moving body operating information by the time interval extracted by the collator.

31. A mobile terminal for a moving body, comprising:

a position detecting unit detecting a current position of the moving body;

a memory storing information concerning a permitted condition of a moving body together with position information in which said permitted condition is established;

a collator reading the condition information corresponding to the current position of the moving body determined by said position detecting unit from said memory, and collating the condition information read from said memory with the current condition of the moving body; and a control unit outputting a message to an individual in the moving body when the condition of the moving body does not meet the permitted condition of the current position collated by said collating means.

32. A mobile terminal for a moving body, comprising:

a memory preliminarily storing work instruction information, including information relating to a kind of work to be executed, and information related to a destination at which the work is to be executed;

a position discriminating unit discriminating a current position of the moving body;

a control unit reading out the work instruction information from said memory, in accordance with the discriminated current position of the moving body; and an output unit outputting the work instruction information read out from the memory.

33. The mobile terminal of claim 32, wherein:

the control unit retrieves the work instruction information corresponding to the destination which is nearest to the discriminated current position of the moving body.

34. The mobile terminal of claim 32, wherein:

the moving body is a vehicle.

35. An operation management system controlling operating information of at least one vehicle, comprising:

a vehicle information database storing a vehicle class of each vehicle including corresponding operation information regarding operations made by each vehicle;

a driving license class database storing identification information of each driver and driving license class regarding authorized vehicle operations of each driver; and a unit extracting said vehicle class information and said driving license class information from received data, and updating said vehicle information database and said driving license class database, based on the extracted vehicle class information and the extracted driving license class information.

36. A moving body operation management system of claim 35, wherein:

said extracting and updating unit outputs a work report of the driver and the vehicle based on the extracted vehicle class information and the extracted driving license class information.

\* \* \* \* \*

UNITED STATES PATENT AND TRADEMARK OFFICE
CERTIFICATE OF CORRECTION

PATENT NO.: 6,073,062
DATED : June 6, 2000
INVENTOR(S): Masao HOSHINO et al.

It is certified that error appears in the above-identified patent and that said Letters Patent is hereby corrected as shown below:

Col. 36, line 26, after "body" insert --by collating the current position of the moving body with the entrance/exit information of the expressway stored ins aid first memory--.

Signed and Sealed this

Twenty-seventh Day of March, 2001

Attest:

NICHOLAS P. GODICI

Attesting Officer

Acting Director of the United States Patent and Trademark Office